US 12,256,306 B2

(12) United States Patent
Yao et al.

(10) Patent No.: US 12,256,306 B2
(45) Date of Patent: Mar. 18, 2025

(54) ROUTE CONFIGURATION METHOD AND APPARATUS

(71) Applicant: Huawei Technologies Co., Ltd., Shenzhen (CN)

(72) Inventors: Qi Yao, Beijing (CN); Zaifeng Zong, Nanjing (CN); Qianghua Zhu, Beijing (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/854,402

(22) Filed: Jun. 30, 2022

(65) Prior Publication Data

US 2022/0330129 A1     Oct. 13, 2022

Related U.S. Application Data

(63) Continuation of application No. PCT/CN2020/140414, filed on Dec. 28, 2020.

(30) Foreign Application Priority Data

Dec. 31, 2019   (CN) .......................... 201911418712.4

(51) Int. Cl.
*H04W 40/02*     (2009.01)
*H04L 12/46*     (2006.01)
(Continued)

(52) U.S. Cl.
CPC ......... *H04W 40/02* (2013.01); *H04L 12/4633* (2013.01); *H04L 45/14* (2013.01); *H04L 45/306* (2013.01); *H04W 40/246* (2013.01)

(58) Field of Classification Search
CPC ... H04L 12/4633; H04L 45/14; H04L 45/306; H04W 36/12; H04W 40/02; H04W 40/24;
(Continued)

(56) References Cited

U.S. PATENT DOCUMENTS 8,325,675 B2 * 12/2012 Wu ................... H04W 36/0011
                                                                                370/329
8,457,063 B2 *  6/2013 Wu ................... H04W 36/0066
                                                                                455/436
(Continued)

FOREIGN PATENT DOCUMENTS

AU       2018445217 A1 *  5/2021  ............. H04W 4/06
BR    112020006069 A2 * 10/2020  ............. H04W 24/02
(Continued)

OTHER PUBLICATIONS

3GPP TS 23.501 V16.3.0, Dec. 2019, "3rd Generation Partnership Project; Technical Specification Group Services and System Aspects; System architecture for the 5G System (5GS); Stage 2 (Release 16)," 417 pages.

(Continued)

*Primary Examiner* — Eric Nowlin
(74) *Attorney, Agent, or Firm* — Conley Rose, P.C.

(57) ABSTRACT

A route configuration method includes that after a first terminal moves out of a service scope of a user plane function (UPF) that currently provides a service for the first terminal, a first session management function (SMF) inserts a first intermediate UPF (I-UPF) into a user plane path of the first terminal, and configures, for the first I-UPF, a first routing rule corresponding to a second terminal. The first routing rule is used to send a packet whose destination address information is address information of the second terminal to a second anchor UPF (A-UPF). Therefore, a packet with a destination address information that is the address information of the second terminal can be directly forwarded by the first I-UPF to the first A-UPF, instead of being forwarded by the first I-UPF to the second A-UPF through the first A-UPF.

20 Claims, 15 Drawing Sheets

(51) Int. Cl.
  *H04L 45/00*  (2022.01)
  *H04L 45/302*  (2022.01)
  *H04W 40/24*  (2009.01)

(58) Field of Classification Search
  CPC ... H04W 40/246; H04W 40/34; H04W 76/10; H04W 76/12
  See application file for complete search history.

(56) References Cited

U.S. PATENT DOCUMENTS

| | | | | |
|---|---|---|---|---|
| 10,285,155 | B1 * | 5/2019 | Dodd-Noble | H04W 4/029 |
| 10,728,817 | B1 * | 7/2020 | Kaki | H04W 36/16 |
| 10,735,995 | B1 * | 8/2020 | Pocha | H04W 28/0263 |
| 10,841,858 | B2 * | 11/2020 | Wu | H04W 40/36 |
| 11,095,559 | B1 * | 8/2021 | Garvia | H04L 45/124 |
| 11,212,850 | B2 * | 12/2021 | Shekhar | H04W 16/02 |
| 11,224,093 | B2 * | 1/2022 | Bharatia | H04W 80/10 |
| 11,272,419 | B2 * | 3/2022 | Yang | H04L 67/63 |
| 11,375,575 | B2 * | 6/2022 | Liu | H04W 80/04 |
| 11,564,284 | B2 * | 1/2023 | Sun | H04W 8/08 |
| 11,678,395 | B2 * | 6/2023 | Kawasaki | H04W 48/18 370/329 |
| 11,683,723 | B2 * | 6/2023 | Zhu | H04W 76/12 370/229 |
| 11,895,033 | B2 * | 2/2024 | Li | H04L 12/189 |
| 12,096,253 | B2 * | 9/2024 | Kahn | H04L 1/22 |
| 12,113,709 | B2 * | 10/2024 | Landais | H04W 40/02 |
| 12,127,078 | B2 * | 10/2024 | Wang | H04W 4/06 |
| 2009/0149183 | A1 * | 6/2009 | Wu | H04W 36/0066 455/436 |
| 2013/0079016 | A1 * | 3/2013 | Wu | H04W 36/144 455/439 |
| 2018/0324646 | A1 * | 11/2018 | Lee | H04W 36/0011 |
| 2019/0053117 | A1 | 2/2019 | Bae et al. | |
| 2019/0090164 | A1 * | 3/2019 | Ding | H04W 36/0016 |
| 2019/0158408 | A1 * | 5/2019 | Li | H04W 72/56 |
| 2019/0191330 | A1 | 6/2019 | Dao et al. | |
| 2019/0394833 | A1 | 12/2019 | Talebi Fard et al. | |
| 2020/0053828 | A1 * | 2/2020 | Bharatia | H04W 76/11 |
| 2020/0092745 | A1 * | 3/2020 | Gundavelli | H04W 36/0016 |
| 2020/0221540 | A1 * | 7/2020 | Sun | H04W 68/005 |
| 2021/0029586 | A1 * | 1/2021 | Zhu | H04W 28/0925 |
| 2021/0044454 | A1 * | 2/2021 | Xu | H04L 49/351 |
| 2021/0136858 | A1 * | 5/2021 | Kawasaki | H04W 72/04 |
| 2021/0211942 | A1 * | 7/2021 | Guo | H04W 28/24 |
| 2021/0259047 | A1 * | 8/2021 | Liu | H04W 80/04 |
| 2021/0337362 | A1 * | 10/2021 | Wang | H04W 4/06 |
| 2021/0360506 | A1 * | 11/2021 | Yang | H04W 40/02 |
| 2021/0377838 | A1 * | 12/2021 | Ali | H04W 8/08 |
| 2021/0392469 | A1 * | 12/2021 | Wang | H04L 12/189 |
| 2022/0060416 | A1 * | 2/2022 | Zhu | H04L 45/74 |
| 2022/0078047 | A1 * | 3/2022 | Yao | H04W 4/08 |
| 2022/0150166 | A1 * | 5/2022 | Yang | H04L 12/4633 |
| 2022/0174514 | A1 * | 6/2022 | Kahn | H04W 76/12 |
| 2022/0182321 | A1 * | 6/2022 | Landais | H04L 45/74 |
| 2022/0255828 | A1 * | 8/2022 | Li | H04L 47/11 |
| 2022/0330129 | A1 * | 10/2022 | Yao | H04W 40/24 |
| 2023/0088071 | A1 * | 3/2023 | Xiong | H04L 63/1425 726/23 |
| 2023/0171848 | A1 * | 6/2023 | Sun | H04W 24/02 |

FOREIGN PATENT DOCUMENTS

| | | | | |
|---|---|---|---|---|
| BR | 112020009916 A2 * | 11/2020 | | H04L 12/189 |
| CN | 109600719 A * | 4/2019 | | H04W 24/02 |
| CN | 110035423 A | 7/2019 | | |
| CN | 110278584 A | 9/2019 | | |
| CN | 110447302 A | 11/2019 | | |
| CN | 110650513 A * | 1/2020 | | H04W 40/248 |
| CN | 111263424 A * | 6/2020 | | H04W 48/16 |
| CN | 111373774 A * | 7/2020 | | H04L 12/189 |
| CN | 111630824 A * | 9/2020 | | H04L 67/14 |
| CN | 112640497 A * | 4/2021 | | H04W 4/06 |
| CN | 109600719 B * | 7/2021 | | H04W 24/02 |
| CN | 110650513 B * | 7/2021 | | H04W 40/248 |
| CN | 113207095 A * | 8/2021 | | H04W 4/06 |
| CN | 111373774 B * | 10/2021 | | H04L 12/189 |
| CN | 113596744 A * | 11/2021 | | H04W 24/02 |
| CN | 111263424 B * | 3/2022 | | H04W 48/16 |
| CN | 110519802 B * | 5/2022 | | H04L 47/2483 |
| CN | 111630824 B * | 7/2022 | | H04L 67/14 |
| CN | 113207095 B * | 8/2022 | | H04W 4/06 |
| CN | 113596744 B * | 11/2023 | | H04W 24/02 |
| CN | 117062107 A * | 11/2023 | | |
| CN | 117135776 A * | 11/2023 | | |
| CN | 118354338 A * | 7/2024 | | |
| EP | 2053796 B1 * | 3/2012 | | H04L 12/4633 |
| EP | 3675531 A1 * | 7/2020 | | H04W 24/02 |
| EP | 3451721 B1 * | 12/2020 | | H04L 61/2007 |
| EP | 3755048 A1 * | 12/2020 | | H04L 47/2483 |
| EP | 3800916 A1 * | 4/2021 | | H04W 16/02 |
| EP | 3800930 A1 * | 4/2021 | | H04W 16/02 |
| EP | 3729748 B1 * | 6/2021 | | H04L 67/2819 |
| EP | 3893556 A1 * | 10/2021 | | H04W 48/16 |
| EP | 3905643 A1 * | 11/2021 | | H04L 67/2819 |
| EP | 3755048 B1 * | 4/2022 | | H04L 47/2483 |
| EP | 3857940 B1 * | 9/2022 | | H04L 12/4633 |
| EP | 4075868 A1 * | 10/2022 | | H04L 12/4633 |
| EP | 3864865 B1 * | 3/2023 | | H04W 4/06 |
| EP | 4192045 A1 * | 6/2023 | | H04W 4/06 |
| EP | 3711312 B1 * | 7/2023 | | H04L 12/189 |
| EP | 3675531 B1 * | 11/2023 | | H04W 24/02 |
| EP | 3542590 B1 * | 1/2024 | | H04W 36/0069 |
| EP | 4336886 A2 * | 3/2024 | | H04W 24/02 |
| EP | 3777069 B1 * | 5/2024 | | H04L 67/14 |
| JP | 2022502902 A * | 1/2022 | | |
| JP | 2022510088 A * | 1/2022 | | |
| JP | 2022510999 A * | 1/2022 | | |
| JP | 7346568 B2 * | 9/2023 | | H04W 48/16 |
| JP | 7381574 B2 * | 11/2023 | | H04W 4/06 |
| KR | 20210068464 A * | 6/2021 | | |
| KR | 20210082521 A * | 7/2021 | | |
| KR | 102430861 B1 * | 8/2022 | | |
| SG | 11202105415 S * | 6/2021 | | |
| WO | WO-2018093367 A1 * | 5/2018 | | H04W 36/0069 |
| WO | 2018236830 A1 | 12/2018 | | |
| WO | WO-2019062754 A1 * | 4/2019 | | H04W 24/02 |
| WO | WO-2020001253 A1 * | 1/2020 | | H04W 40/248 |
| WO | WO-2020068805 A1 * | 4/2020 | | H04L 12/4633 |
| WO | WO-2020073207 A1 * | 4/2020 | | H04W 4/06 |
| WO | WO-2020074464 A1 * | 4/2020 | | H04L 67/2819 |
| WO | WO-2020114382 A1 * | 6/2020 | | H04W 48/16 |
| WO | WO-2020204949 A1 * | 10/2020 | | H04L 1/22 |
| WO | WO-2021047448 A1 * | 3/2021 | | H04L 47/24 |
| WO | WO-2021063744 A1 * | 4/2021 | | H04W 16/02 |
| WO | WO-2021063764 A1 * | 4/2021 | | H04W 16/02 |

OTHER PUBLICATIONS

3GPP TR 23.734 V16.2.0, Jun. 2019, "3rd Generation Partnership Project; Technical Specification Group Services and System Aspects; Study on enhancement of 5G System (5GS) for vertical and Local Area Network (LAN) services (Release 16)," 117 pages.

China Telecom, "Correcting references for routing rules configuration," 3GPP TSG-SA WG2 Meeting #130 S2-1900541, Jan. 21-25, 2019, Kochi, India, 8 pages.

Huawei et al., "ETSUN: Update procedures," 3GPP TSG-SA WG2 Meeting #135, S2-1910277, Oct. 14-18, 2019, Split Croatia, 27 pages.

Huawei et al., "Clarification on UPF tunnel change," 3GPP TSG-SA WG2 Meeting #128bis, S2-188841, Aug. 20-24, Sophia Antipolis, France, 22 pages.

* cited by examiner

ROUTE CONFIGURATION METHOD AND APPARATUS

CROSS-REFERENCE TO RELATED APPLICATIONS

This is a continuation of International Patent Application No. PCT/CN2020/140414 filed on Dec. 28, 2020, which claims priority to Chinese Patent Application No. 201911418712.4 filed on Dec. 31, 2019. The disclosures of the aforementioned applications are hereby incorporated by reference in their entireties.

TECHNICAL FIELD

This disclosure relates to the field of communications technologies, and in particular, to a route configuration method and an apparatus.

BACKGROUND

A fifth generation (5G) virtual network (VN) (or a 5G local area network (LAN)) service is provided by a current 5G network, and is mainly applied to home communication, enterprise office, factory manufacturing, internet of vehicles, power grid reconstruction, public security organs, and the like. The 5G VN service can provide private communication of an Internet Protocol (IP) type or a non-IP type (such as an Ethernet type) for two or more terminal devices in a 5G VN group. For example, a 5G VN group includes devices in a factory, and different devices may send Ethernet data packets to each other. Alternatively, a 5G VN group includes office devices (such as mobile phones, computers, or laptop computers) of employees in a department of an enterprise, and different office devices may send IP data packets to each other. If two terminal devices are not in a same 5G VN group, the two terminal devices cannot communicate with each other.

Because a service scope of a user plane function (UPF) in a 5G core network is limited, for any terminal (a first terminal is used as an example below) in a 5G VN group, the first terminal may move out of a service scope of a UPF that serves the first terminal. When the first terminal moves out of a service scope of a UPF that currently serves the first terminal, to ensure service continuity of the first terminal, an intermediate UPF (I-UPF) is inserted into a user plane path of the first terminal, and the I-UPF is used to connect an access network device accessed by the first terminal and an anchor UPF (A-UPF) corresponding to a protocol data unit (PDU) session of the first terminal. When the I-UPF is inserted into the user plane path of the first terminal, an existing route configuration method has a disadvantage, resulting in a relatively high forwarding delay of some packets. For example, in the conventional technology, the I-UPF establishes a tunnel with only the A-UPF corresponding to the PDU session of the first terminal, so that a routing rule configured on the I-UPF is used to send all uplink packets to the A-UPF corresponding to the PDU session of the first terminal. Consequently, the routing rule configured on the I-UPF cannot efficiently forward a packet sent by the first terminal to a terminal served by another A-UPF.

SUMMARY

This disclosure provides a route configuration method and an apparatus, to improve a route configuration method in the conventional technology when an I-UPF is inserted into a user plane path of a first terminal. This shortens a packet forwarding delay and improves packet forwarding efficiency.

According to a first aspect, a route configuration method is provided. The method includes the following. A first session management network element determines a first intermediate user plane network element that serves a first terminal in a virtual network group. The first intermediate user plane network element is configured to maintain communication between a first anchor user plane network element and an access network device accessed by the first terminal, and the first anchor user plane network element is a user plane anchor of a PDU session of the first terminal. The first session management network element obtains uplink tunnel information of a second anchor user plane network element and address information of a corresponding second terminal. The second anchor user plane network element meets the following conditions: (1) the second anchor user plane network element provides an anchor service for the second terminal in the virtual network group, where the second terminal is located in a service area of the second anchor user plane network element, and (2) the second anchor user plane network element is different from the first anchor user plane network element. Then, the first session management network element generates, based on the address information of the second terminal and the uplink tunnel information of the second anchor user plane network element, a first routing rule corresponding to the second terminal. The first routing rule is used to send a packet whose destination address information is the address information of the second terminal to the second anchor user plane network element. The first session management network element sends the first routing rule to the first intermediate user plane network element.

According to the technical solution provided in the first aspect, when the first intermediate user plane network element is inserted into a user plane path of the first terminal, the first session management network element generates the first routing rule corresponding to the second terminal, and sends the first routing rule to the first anchor user plane network element, so that the first anchor user plane network element can install the first routing rule. Therefore, a difference from the conventional technology in which the first intermediate user plane network element first needs to forward a packet whose destination address information is the address information of the second terminal to the first anchor user plane network element and then the first anchor user plane network element forwards the packet to the second anchor user plane network element is that, in the technical solution provided in this disclosure, the first anchor user plane network element may directly send a packet whose destination address information is the address information of the second terminal to the second anchor user plane network element according to the first routing rule. It can be learned that the technical solution in this disclosure reduces a quantity of forwarding nodes through which a packet whose destination address information is the address information of the second terminal needs to pass, and therefore can shorten a packet forwarding delay and improve forwarding efficiency.

In a possible design, the method further includes the following. The first session management network element obtains uplink tunnel information of the first anchor user plane network element. The first session management network element generates a second routing rule based on the uplink tunnel information of the first anchor user plane network element. The second routing rule is used to send a packet that does not match another routing rule to the first anchor user plane network element. The first session management network element sends the second routing rule to the first intermediate user plane network element. According to this design, the first intermediate user plane network element may install the second routing rule, so that the first intermediate user plane network element can normally forward a packet whose destination address information is not the address information of the second terminal.

In a possible design, the method further includes the following. The first session management network element obtains address information of the first terminal and downlink tunnel information of the access network device accessed by the first terminal. The first session management network element generates, based on the address information of the first terminal and the downlink tunnel information of the access network device accessed by the first terminal, a third routing rule corresponding to the first terminal. The third routing rule is used to send a packet whose destination address information is the address information of the first terminal to the access network device accessed by the first terminal. The first session management network element sends the third routing rule to the first intermediate user plane network element. According to this design, the first intermediate user plane network element may install the third routing rule, so that the first intermediate user plane network element can normally forward a packet whose destination address information is the address information of the first terminal.

In a possible design, the method further includes the following. The first session management network element obtains address information of a third terminal and downlink tunnel information of an access network device accessed by the third terminal. The third terminal is a terminal other than the first terminal served by the first intermediate user plane network element in the virtual network group. The first session management network element generates, based on the address information of the third terminal and the downlink tunnel information of the access network device accessed by the third terminal, a fifth routing rule corresponding to the third terminal. The fifth routing rule is used to send a packet whose destination address information is the address information of the third terminal to the access network device accessed by the third terminal. The first session management network element sends the fifth routing rule to the first intermediate user plane network element. According to this design, the first intermediate user plane network element may install the fifth routing rule corresponding to the third terminal, so that the first intermediate user plane network element can forward, through local handover, a packet sent by the first terminal to the third terminal. This shortens a delay of sending a packet to the third terminal by the first terminal.

In a possible design, the method further includes the following. If the first session management network element is an anchor session management network element, the first session management network element obtains the address information of the first terminal and downlink tunnel information of the second anchor user plane network element. The anchor session management network element is configured to manage anchor user plane network elements that serve the virtual network group. The first session management network element generates, based on the address information of the first terminal and the downlink tunnel information of the second anchor user plane network element, a fourth routing rule corresponding to the second anchor user plane network element. The fourth routing rule is used to send a packet whose destination address information is the address information of the first terminal to the first intermediate user plane network element. The first session management network element sends the fourth routing rule to the second anchor user plane network element. According to this design, the second anchor user plane network element may install the fourth routing rule. A difference from the conventional technology in which the second anchor user plane network element needs to send a packet whose destination address information is the address information of the first terminal to the first anchor user plane network element and then the first anchor user plane network element sends the packet to the first intermediate user plane network element is that, in the technical solution provided in this disclosure, the second anchor user plane network element may directly send a packet whose destination address information is the address information of the first terminal to the first intermediate user plane network element according to the fourth routing rule. It can be learned that the technical solution in this disclosure reduces a quantity of forwarding nodes through which a packet whose destination address information is the address information of the first terminal needs to pass, and therefore can shorten a packet forwarding delay and improve forwarding efficiency.

In a possible design, the method further includes the following. If the first session management network element is not an anchor session management network element, the first session management network element obtains downlink tunnel information of the second anchor user plane network element. The anchor session management network element is configured to manage anchor user plane network elements that serve the virtual network group. The first session management network element sends the downlink tunnel information of the second anchor user plane network element to the anchor session management network element. The downlink tunnel information of the second anchor user plane network element is used to enable the anchor session management network element to generate a fourth routing rule corresponding to the second anchor user plane network element, and the fourth routing rule is used to send a packet whose destination address information is the address information of the first terminal to the first intermediate user plane network element.

According to a second aspect, a route configuration method is provided. The method includes the following. A first intermediate user plane network element receives a first routing rule that corresponds to a second terminal and that is sent by a first session management network element. The first intermediate user plane network element is configured to maintain communication between a first anchor user plane network element and an access network device accessed by a first terminal, the first anchor user plane network element is a user plane anchor of a PDU session of the first terminal, the second terminal and the first terminal belong to a same virtual network group, the first routing rule is used to send a packet whose destination address information is address information of the second terminal to a second anchor user plane network element, and the second anchor user plane network element meets the following conditions: (1) the second anchor user plane network element provides an anchor service for the second terminal in the virtual network group, where the second terminal is located in a service area of the second anchor user plane network element, and (2) the second anchor user plane network element is different from the first anchor user plane network element. The first intermediate user plane network element installs the first routing rule.

According to the technical solution provided in the second aspect, when the first intermediate user plane network element is inserted into a user plane path of the first terminal, the first anchor user plane network element receives the first routing rule, and installs the first routing rule. Therefore, a difference from the conventional technology in which the first intermediate user plane network element first needs to forward a packet whose destination address information is the address information of the second terminal to the first anchor user plane network element and then the first anchor user plane network element forwards the packet to the second anchor user plane network element is that, in the technical solution provided in this disclosure, the first anchor user plane network element may directly send a packet whose destination address information is the address information of the second terminal to the second anchor user plane network element according to the first routing rule. It can be learned that the technical solution in this disclosure reduces a quantity of forwarding nodes through which a packet whose destination address information is the address information of the second terminal needs to pass, and therefore can shorten a packet forwarding delay and improve forwarding efficiency.

In a possible design, the method further includes the following. The first intermediate user plane network element receives a second routing rule sent by the first session management network element. The second routing rule is used to send a packet that does not match another routing rule to the first anchor user plane network element. The first intermediate user plane network element installs the second routing rule. According to this design, the first intermediate user plane network element may normally forward, according to the second routing rule, a packet whose destination address information is not the address information of the second terminal.

In a possible design, the method further includes the following. The first intermediate user plane network element receives a third routing rule sent by the first session management network element. The third routing rule is used to send a packet whose destination address information is address information of the first terminal to the access network device accessed by the first terminal. The first intermediate user plane network element installs the third routing rule. According to this design, the first intermediate user plane network element may normally forward, according to the third routing rule, a packet whose destination address information is the address information of the first terminal.

In a possible design, the method further includes the following. The first intermediate user plane network element receives a fifth routing rule corresponding to a third terminal. The third terminal is a terminal other than the first terminal served by the first intermediate user plane network element in the virtual network group, and the fifth routing rule is used to send a packet whose destination address information is address information of the third terminal to an access network device accessed by the third terminal. The first intermediate user plane network element installs the fifth routing rule. According to this design, the first intermediate user plane network element may forward, through local handover according to the fifth routing rule corresponding to the third terminal, a packet sent by the first terminal to the third terminal. This shortens a delay of sending a packet to the third terminal by the first terminal.

According to a third aspect, a route configuration method is provided. The method includes the following. When a first intermediate user plane network element is inserted into a user plane path of a first terminal, an anchor session management network element obtains address information of the first terminal in a virtual network group. The anchor session management network element is configured to manage anchor user plane network elements that serve the virtual network group, the anchor user plane network element is a user plane anchor of a PDU session of at least one terminal in the virtual network group, the first intermediate user plane network element is configured to maintain communication between a first anchor user plane network element and an access network device accessed by the first terminal, and the first anchor user plane network element is a user plane anchor of a PDU session of the first terminal. The anchor session management network element obtains downlink tunnel information of a second anchor user plane network element. The second anchor user plane network element is an anchor user plane network element other than the first anchor user plane network element in the anchor user plane network elements that serve the virtual network group. The anchor session management network element generates, based on the address information of the first terminal and the downlink tunnel information of the second anchor user plane network element, a fourth routing rule corresponding to the second anchor user plane network element. The fourth routing rule is used to send a packet whose destination address information is the address information of the first terminal to the first intermediate user plane network element. The anchor session management network element sends the fourth routing rule to the second anchor user plane network element.

According to the technical solution provided in the third aspect, when the first intermediate user plane network element is inserted into the user plane path of the first terminal, the anchor session management network element generates the fourth routing rule corresponding to the second anchor user plane network element, and sends the fourth routing rule to the second anchor user plane network element, so that the second anchor user plane network element installs the routing rule. Therefore, a difference from the conventional technology in which the second anchor user plane network element needs to send a packet whose destination address information is the address information of the first terminal to the first anchor user plane network element and then the first anchor user plane network element sends the packet to the first intermediate user plane network element is that, in the technical solution provided in this disclosure, the second anchor user plane network element may directly send a packet whose destination address information is the address information of the first terminal to the first intermediate user plane network element according to the fourth routing rule. It can be learned that the technical solution in this disclosure reduces a quantity of forwarding nodes through which a packet whose destination address information is the address information of the first terminal needs to pass, and therefore can shorten a packet forwarding delay and improve forwarding efficiency.

According to a fourth aspect, a route configuration method is provided. The method includes the following. A second anchor user plane network element receives a fourth routing rule. The second anchor user plane network element is an anchor user plane network element other than a first anchor user plane network element in anchor user plane network elements that serve a virtual network group, the anchor user plane network element is a user plane anchor of a PDU session of at least one terminal in the virtual network group, the first anchor user plane network element is a user plane anchor of a PDU session of a first terminal, the fourth routing rule is used to send a packet whose destination address information is address information of the first terminal to a first intermediate user plane network element, and the first intermediate user plane network element is configured to maintain communication between the first anchor user plane network element and an access network device accessed by the first terminal. The second anchor user plane network element installs the fourth routing rule.

According to the technical solution provided in the fourth aspect, a difference from the conventional technology in which the second anchor user plane network element needs to send a packet whose destination address information is the address information of the first terminal to the first anchor user plane network element and then the first anchor user plane network element sends the packet to the first intermediate user plane network element is that, in the technical solution provided in this disclosure, the second anchor user plane network element may directly send a packet whose destination address information is the address information of the first terminal to the first intermediate user plane network element according to the fourth routing rule. It can be learned that the technical solution in this disclosure reduces a quantity of forwarding nodes through which a packet whose destination address information is the address information of the first terminal needs to pass, and therefore can shorten a packet forwarding delay and improve forwarding efficiency.

According to a fifth aspect, a communications apparatus is provided. The apparatus includes a processing unit and a communications unit. The processing unit is configured to determine a first intermediate user plane network element that serves a first terminal in a virtual network group, obtain address information of a second terminal and uplink tunnel information of a second anchor user plane network element that serves the second terminal, and generate, based on the address information of the second terminal and the uplink tunnel information of the second anchor user plane network element, a first routing rule corresponding to the second terminal. The first intermediate user plane network element is configured to maintain communication between a first anchor user plane network element and an access network device accessed by the first terminal, the first anchor user plane network element is a user plane anchor of a PDU session of the first terminal, the first routing rule is used to send a packet whose destination address information is the address information of the second terminal to the second anchor user plane network element, and the second anchor user plane network element meets the following conditions: (1) the second anchor user plane network element provides an anchor service for the second terminal in the virtual network group, where the second terminal is located in a service area of the second anchor user plane network element, and (2) the second anchor user plane network element is different from the first anchor user plane network element. The communications unit is configured to send the first routing rule to the first intermediate user plane network element.

In a possible design, the processing unit is further configured to obtain uplink tunnel information of the first anchor user plane network element, and generate a second routing rule based on the uplink tunnel information of the first anchor user plane network element, where the second routing rule is used to send a packet that does not match another routing rule to the first anchor user plane network element, and the communications unit is further configured to send the second routing rule to the first intermediate user plane network element.

In a possible design, the processing unit is further configured to obtain address information of the first terminal and downlink tunnel information of the access network device accessed by the first terminal, and generate, based on the address information of the first terminal and the downlink tunnel information of the access network device accessed by the first terminal, a third routing rule corresponding to the first terminal, where the third routing rule is used to send a packet whose destination address information is the address information of the first terminal to the access network device accessed by the first terminal, and the communications unit is further configured to send the third routing rule to the first intermediate user plane network element.

In a possible design, the processing unit is further configured to obtain address information of a third terminal and downlink tunnel information of an access network device accessed by the third terminal, and generate, based on the address information of the third terminal and the downlink tunnel information of the access network device accessed by the third terminal, a fifth routing rule corresponding to the third terminal, where the third terminal is a terminal other than the first terminal served by the first intermediate user plane network element in the virtual network group, and the fifth routing rule is used to send a packet whose destination address information is the address information of the third terminal to the access network device accessed by the third terminal, and the communications unit is further configured to send the fifth routing rule to the first intermediate user plane network element.

In a possible design, the processing unit is further configured to, when the first session management network element is an anchor session management network element, obtain the address information of the first terminal and downlink tunnel information of the second anchor user plane network element, and generate, based on the address information of the first terminal and the downlink tunnel information of the second anchor user plane network element, a fourth routing rule corresponding to the second anchor user plane network element, where the anchor session management network element is configured to manage anchor user plane network elements that serve the virtual network group, and the fourth routing rule is used to send a packet whose destination address information is the address information of the first terminal to the first intermediate user plane network element, and the communications unit is further configured to send the fourth routing rule to the second anchor user plane network element.

In a possible design, the processing unit is further configured to, when the first session management network element is not an anchor session management network element, obtain the address information of the first terminal and downlink tunnel information of the second anchor user plane network element, where the anchor session management network element is configured to manage anchor user plane network elements that serve the virtual network group, the downlink tunnel information of the second anchor user plane network element is used to enable the anchor session management network element to generate a fourth routing rule corresponding to the second anchor user plane network element, and the fourth routing rule is used to send a packet whose destination address information is the address information of the first terminal to the first intermediate user plane network element, and the communications unit is further configured to send the downlink tunnel information of the second anchor user plane network element to the anchor session management network element.

According to a sixth aspect, a communications apparatus is provided. The apparatus includes a communications unit configured to, after a first intermediate user plane network element is inserted into a user plane path of a first terminal, receive a first routing rule that corresponds to a second terminal and that is sent by a first session management network element, where the first intermediate user plane network element is configured to maintain communication between a first anchor user plane network element and an access network device accessed by the first terminal, the first anchor user plane network element is a user plane anchor of a PDU session of the first terminal, the second terminal and the first terminal belong to a same virtual network group, the first routing rule is used to send a packet whose destination address information is address information of the second terminal to a second anchor user plane network element, and the second anchor user plane network element meets the following conditions: (1) the second anchor user plane network element provides an anchor service for the second terminal in the virtual network group, where the second terminal is located in a service area of the second anchor user plane network element, and (2) the second anchor user plane network element is different from the first anchor user plane network element, and a processing unit configured to install the first routing rule corresponding to the second terminal.

In a possible design, the communications unit is further configured to receive a second routing rule sent by the first session management network element, where the second routing rule is used to send a packet that does not match another routing rule to the first anchor user plane network element, and the processing unit is further configured to install the second routing rule.

In a possible design, the communications unit is further configured to receive a third routing rule sent by the first session management network element, where the third routing rule is used to send a packet whose destination address information is address information of the first terminal to the access network device accessed by the first terminal, and the processing unit is further configured to install the third routing rule.

In a possible design, the communications unit is further configured to receive a fifth routing rule corresponding to a third terminal, where the third terminal is a terminal other than the first terminal served by the first intermediate user plane network element in the virtual network group, and the fifth routing rule is used to send a packet whose destination address information is address information of the third terminal to an access network device accessed by the third terminal, and the processing unit is further configured to install the fifth routing rule.

According to a seventh aspect, a communications apparatus is provided. The apparatus includes a processing unit and a communications unit. The processing unit is configured to obtain address information of a first terminal in a virtual network group, obtain downlink tunnel information of a second anchor user plane network element, and generate, based on the address information of the first terminal and the downlink tunnel information of the second anchor user plane network element, a fourth routing rule corresponding to the second anchor user plane network element. The second anchor user plane network element is an anchor user plane network element other than a first anchor user plane network element in anchor user plane network elements that serve the virtual network group, the first anchor user plane network element is a user plane anchor of a PDU session of the first terminal, a first intermediate user plane network element is configured to maintain communication between the first anchor user plane network element and an access network device accessed by the first terminal, and the fourth routing rule is used to send a packet whose destination address information is the address information of the first terminal to the first intermediate user plane network element. The communications unit is configured to send the fourth routing rule to the second anchor user plane network element.

According to an eighth aspect, a communications apparatus is provided. The communications apparatus is configured to implement a function of a second anchor user plane network element, the second anchor user plane network element is an anchor user plane network element other than a first anchor user plane network element in anchor user plane network elements that serve a virtual network group, the anchor user plane network element is a user plane anchor of a PDU session of at least one terminal in the virtual network group, the first anchor user plane network element is a user plane anchor of a PDU session of a first terminal, and the communications apparatus includes a processing unit and a communications unit. The communications unit is configured to receive a fourth routing rule. The fourth routing rule is used to send a packet whose destination address information is address information of the first terminal to a first intermediate user plane network element, and the first intermediate user plane network element is configured to maintain communication between the first anchor user plane network element and an access network device accessed by the first terminal. The processing unit is further configured to install the fourth routing rule.

According to a ninth aspect, a communications apparatus is provided. The communications apparatus includes a processor and a communications interface. The processor is configured to execute computer program instructions, so that the communications apparatus implements the route configuration method in any design provided in any one of the first aspect to the fourth aspect.

According to a tenth aspect, a computer-readable storage medium is provided. The computer-readable storage medium stores instructions. When the instructions are run on a computer, the computer is enabled to implement the route configuration method in any design provided in any one of the first aspect to the fourth aspect.

According to an eleventh aspect, a computer program product is provided. The computer program product includes instructions. When the computer program product runs on a computer, the computer is enabled to implement the route configuration method in any design provided in any one of the first aspect to the fourth aspect.

According to a twelfth aspect, a chip is provided. The chip includes a processor. When the processor executes computer program instructions, a computer is enabled to implement the route configuration method in any design provided in any one of the first aspect to the fourth aspect.

According to a thirteenth aspect, a communications system is provided. The communications system includes a first session management function (SMF), a first I-UPF, an anchor-SMF (A-SMF), and a second A-UPF. The first SMF is configured to perform the route configuration method in any design in the first aspect. The first I-UPF is configured to perform the route configuration method in any design in the second aspect. The A-SMF is configured to perform the route configuration method in any design in the third aspect. The second A-UPF is configured to perform the route configuration method in any design in the fourth aspect.

For beneficial effects of any one of the ninth aspect to the thirteenth aspect, refer to descriptions of corresponding designs in the first aspect or the second aspect. Details are not described herein again.

DESCRIPTION OF EMBODIMENTS

Figure 1:
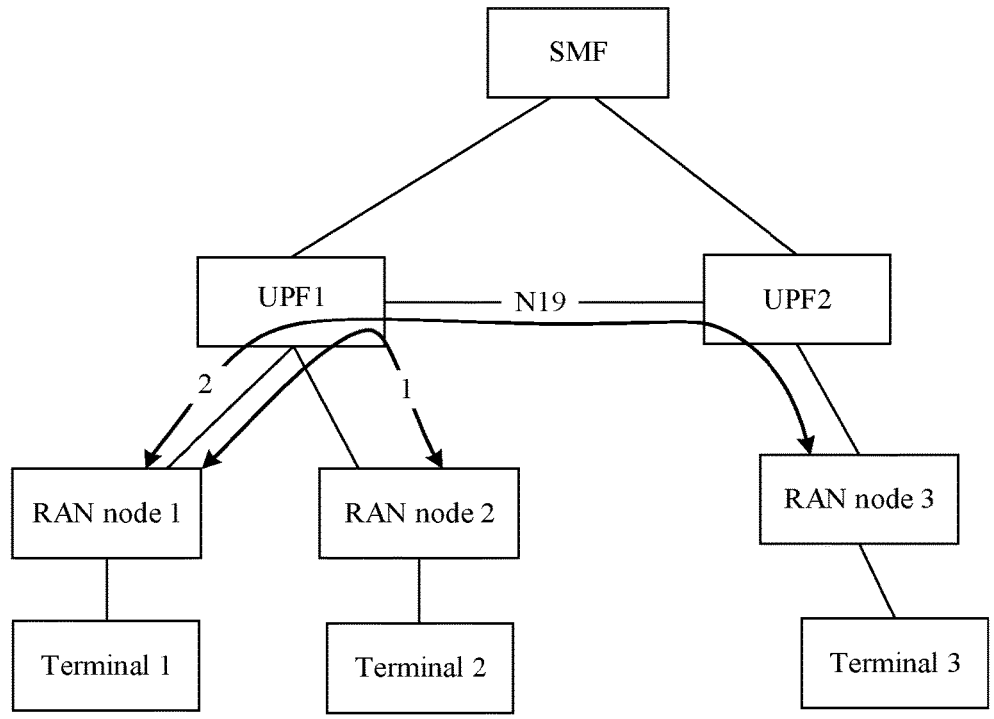
FIG. 1 is a schematic diagram of a system architecture of a 5G VN.

In descriptions of this disclosure, unless otherwise specified, "/" means "or". For example, A/B may represent A or B. A term "and/or" in this specification describes only an association relationship between associated objects and indicates that there may be three relationships. For example, A and/or B may represent the following three cases: only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this disclosure, a term such as "example" or "for example" is used to represent giving an example, an illustration, or a description. Any embodiment or design solution described by using "example" or "for example" in this disclosure shall not be construed as being more preferred or more advantageous than another embodiment or design solution. Exactly, use of the term such as "example" or "for example" is intended to present a related concept in a specific manner.

To facilitate understanding of the technical solutions in this disclosure, the following first briefly describes technical terms in this disclosure.

1. PDU Session:

A 5G core network supports a PDU connection service, and the PDU connection service is a service of exchanging a PDU data packet between a terminal and a data network (DN). The PDU connection service is implemented by initiating PDU session establishment by the terminal. The terminal establishes a PDU session, in other words, establishes a data transmission channel between the terminal and the DN.

It should be noted that the terminal may initiate establishment of one or more PDU sessions to connect to a same DN or different DNs. The terminal may initiate PDU session establishment based on a group of core network elements (such as an SMF network element, a policy control function (PCF) network element, and a UPF network element).

Each PDU session supports one PDU session type. For example, the PDU session type may be IP version 4 (IPv4), IP version 6 (IPv6), or the Ethernet.

2. N4 Session:

One PDU session may be served by one or more UPFs. To manage a UPF that serves a PDU session, the SMF may perform an N4 session management procedure to control a function of the UPF. For example, the SMF may establish, update, or delete an N4 session context in the UPF.

The N4 session context is identified by an N4 session ID. The SMF and the UPF each generate an N4 session context, to store parameters related to an N4 session, for example, an N4 session identifier (ID). The parameters are used for all of a packet detection rule (PDR), a forwarding action rule (FAR), a quality of service (QOS) enforcement rule (QER), and a usage reporting rule (URR) of the N4 session.

The UPF implements PDU session packet forwarding by using the parameters in the N4 session context such as the PDR, the FAR, the QER, and the URR.

For example, after receiving a packet from an ingress, the UPF determines an N4 session to which the packet belongs. Then, the UPF performs matching between a PDR (which may be one or more PDRs) in the N4 session context and characteristic information of the packet, to find a PDR that matches the packet. The PDR specifies an FAR, a QER, and a URR corresponding to the packet. Therefore, the UPF may drop the packet, forward the packet, buffer the packet, notify a control plane of the packet, duplicate the packet, or the like according to the FAR. The UPF network element may perform a QoS operation on the packet according to the QER. The UPF network element may perform usage reporting on the packet according to the URR.

3. Tunnel:

In embodiments of this disclosure, the tunnel may be classified into the following two types: (1) A tunnel between an access network device and a UPF. The tunnel between an access network device and a UPF may have another name, for example, a next generation (NG) 3 interface (N3) tunnel.

(2) A tunnel between two UPFs. The tunnel between two UPFs may have another name. For example, a tunnel between an A-UPF and an I-UPF may be referred to as an N9 tunnel. A tunnel between two A-UPFs may be referred to as an N19 tunnel.

It should be noted that the tunnel may be a tunnel at a session granularity, a tunnel at a device granularity, or a tunnel at a group granularity.

The tunnel at a session granularity is a tunnel used only for one PDU session. The tunnel at a session granularity is used to transmit only a data packet of a corresponding PDU session.

The tunnel at a device granularity is a unique tunnel established between two devices (for example, a radio access network (RAN) node and a UPF). The tunnel is used to transmit data of all terminals served by the two devices.

The tunnel at a group granularity is a tunnel used by all terminals in one group. The tunnel at a group granularity is used to transmit only a data packet of a terminal in a corresponding group.

4. A-UPF and A-SMF:

The A-UPF is a user plane anchor of a PDU session of at least one terminal in a 5G VN group. It may be understood that different terminals may have different user plane anchors of PDU sessions in the 5G VN group. Therefore, there may be a plurality of A-UPFs that serve the 5G VN group.

The A-SMF is an SMF configured to manage an A-UPF.

The foregoing describes the technical terms in this disclosure. Details are not described below again.

For a 5G VN service, 3rd Generation Partnership Project (3GPP) Technical Rule (TR) 23.734 proposes to support one-to-one communication and one-to-many communication in a 5G VN. Further, to support one-to-one communication and one-to-many communication in the 5G VN, a 3GPP network is required to support group-based unicast, multicast, and broadcast, support duplication and distribution of multicast and broadcast packets, and support any terminal as a multicast source.

To meet this requirement, it is currently defined in 3GPP Technical Standard (TS) 23.501 that one 5G VN is managed by only one SMF. As shown in FIG. 1, the SMF manages one UPF or simultaneously manages a plurality of UPFs. FIG. 1 is drawn by using an example in which the SMF manages UPF1 and UPF2. UPF1 and UPF2 maintain routing rules. UPF1 and UPF2 may perform packet forwarding according to the routing rules maintained by UPF1 and UPF2. When two terminals (for example, a terminal 1 and a terminal 2 in FIG. 1) served by a same UPF perform one-to-one communication, transmission is performed through local handover of the UPF. When two terminals (for example, the terminal 1 and a terminal 3 in FIG. 1) served by different UPFs perform one-to-one communication, transmission needs to be performed through a tunnel between UPF1 and UPF2.

In this embodiment of this disclosure, two UPFs may exchange tunnel information through an SMF, to establish a tunnel. A tunnel (or a forwarding path) corresponding to tunnel information of a UPF network element may be constructed in a manner of a virtual LAN (VLAN), a Virtual Extensible LAN (VxLAN), a General Packet Radio Service (GPRS) Tunneling Protocol (GTP)-user plane (GTP-U), a Generic Routing Encapsulation (GRE) protocol, or an IP tunnel. The foregoing construction manner may be dynamic, or may be pre-configured in a network. This is not limited in this embodiment of this disclosure. Different construction manners correspond to different tunnel information. For example, when the VLAN is used for construction, the tunnel information may be a UPF ID, a UPF ID+a VLAN ID (VID), or media access control (MAC)+a VID. Alternatively, for example, when the VxLAN is used for construction, the tunnel information may be a UPF ID, a UPF ID+a VID, an IP address+a VID, or an IP address+a port number+a VID. Alternatively, for example, when the GTP-U is used for construction, the tunnel information may be a UPF ID, a UPF ID+a tunnel endpoint identifier (TEID), an IP address+a TEID, or an IP address+a port+a TEID. Alternatively, for example, when the GRE is used for construction, the tunnel information may be a UPF ID, a UPF ID+a key, an IP address+a key, or an IP address+a port+a key. Alternatively, when the IP tunnel is used for construction, the tunnel information may be a UPF ID, an IP address, or an IP address+a port. If the tunnel information includes the UPF ID, the UPF ID may be a MAC address or an IP address, or an IP address+a port, or the SMF network element or the UPF network element may determine a corresponding MAC address or IP address, or an IP address+a port based on the UPF ID. A general description is provided herein. Details are not described below again.

In an architecture shown in FIG. 1, the SMF is mainly responsible for all control plane functions of terminal session management, including UPF selection and control, IP address allocation and management, session QoS management, a function of obtaining a policy and charging control (PCC) policy from a PCF, and the like.

In the architecture shown in FIG. 1, the UPF serves as an anchor of a PDU session connection, and is responsible for data packet filtering, data transmission/forwarding, rate control, charging information generation, user plane QoS processing, uplink transmission authentication, transmission class verification, downlink data packet buffering, downlink data notification triggering, and the like of the terminal.

In the architecture shown in FIG. 1, a RAN is a RAN node, and the RAN node may also be referred to as an access network device. For example, the RAN node may be a transmission reception point (TRP), a base station, or a control node in various forms (for example, a network controller or a radio controller (for example, a radio controller in a cloud RAN (CRAN) scenario)). Further, the RAN node may be a macro base station, a micro base station (or a small cell), a relay station, an access point (AP), or the like in various forms, or may be an antenna panel of a base station. The control node may be connected to a plurality of base stations, and configure resources for a plurality of terminal devices within coverage of the plurality of base stations. In systems using different radio access technologies, devices that have base station functions may have different names. For example, the device may be referred to as an evolved NodeB (eNB or eNodeB) in a Long-Term Evolution (LTE) system, or may be referred to as a next generation NodeB (gNB) in a 5G system or a New Radio (NR) system. A specific name of the base station is not limited in this disclosure. The RAN node may alternatively be a network device in a future evolved public land mobile network (PLMN) or the like.

In the architecture shown in FIG. 1, the terminal is an entity that is on a user side and that is configured to receive a signal, send a signal, or receive a signal and send a signal. The terminal is configured to provide a user with one or more of a voice service and a data connectivity service. Alternatively, the terminal may be referred to as user equipment (UE), a terminal device, an access terminal, a subscriber unit, a subscriber station, a mobile station, a remote station, a remote terminal, a mobile device, a user terminal, a wireless communications device, a user agent, or a user apparatus. The terminal may be a vehicle-to-everything (V2X) device, for example, a smart car (or intelligent car), a digital car, an unmanned car (driverless car, pilotless car, or automobile), a self-driving car (or autonomous car), a pure electric vehicle (EV) (or Battery EV), a hybrid electric vehicle (HEV), a range extended electric vehicle (REEV), a plug-in HEV (PHEV), a new energy vehicle, or a road side unit (RSU). Alternatively, the terminal may be a device-to-device (D2D) device, for example, an electricity meter or a water meter. Alternatively, the terminal may be a mobile station (MS), a subscriber unit, an unmanned aerial vehicle, an Internet of things (IoT) device, a station (ST) in a wireless LAN (WLAN), a cellular phone, a smartphone, a cordless telephone set, a wireless data card, a tablet computer, a Session Initiation Protocol (SIP) phone, a wireless local loop (WLL) station, a personal digital assistant (PDA) device, a laptop computer, a machine type communication (MTC) terminal, a handheld device having a wireless communications function, a computing device, another processing device connected to a wireless modem, a vehicle-mounted device, or a wearable device (or a wearable intelligent device). Alternatively, the terminal may be a terminal in a next generation communications system, for example, a terminal in a 5G system, a terminal in a future evolved PLMN, or a terminal in an NR system.

Figure 2:
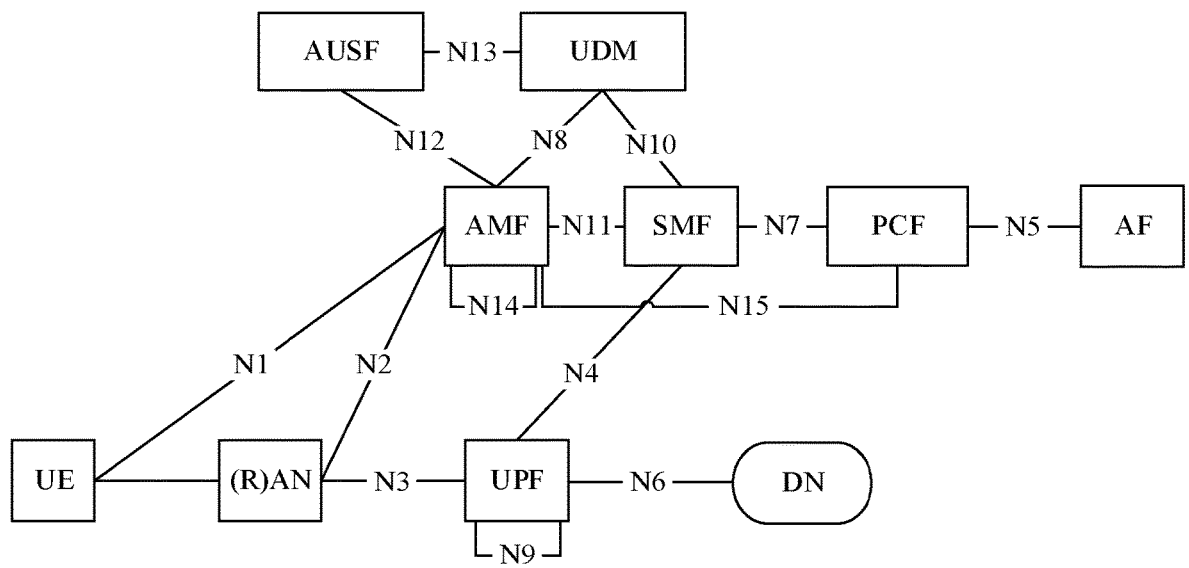
FIG. 2 is a schematic diagram of a 5G network architecture according to an embodiment of this disclosure.

Optionally, as shown in FIG. 2, a current 5G network may further include the following network elements: an access and mobility management function (AMF) network element, an authentication server function (AUSF) network element, a network slice selection function (NSSF) network element, a network exposure function (NEF) network element, a network repository function (NRF) network element, a policy control function (PCF) network element, a unified data management (UDM) network element, an application function (AF) network element, and the like. This is not limited in this embodiment of this disclosure.

Figure 3:
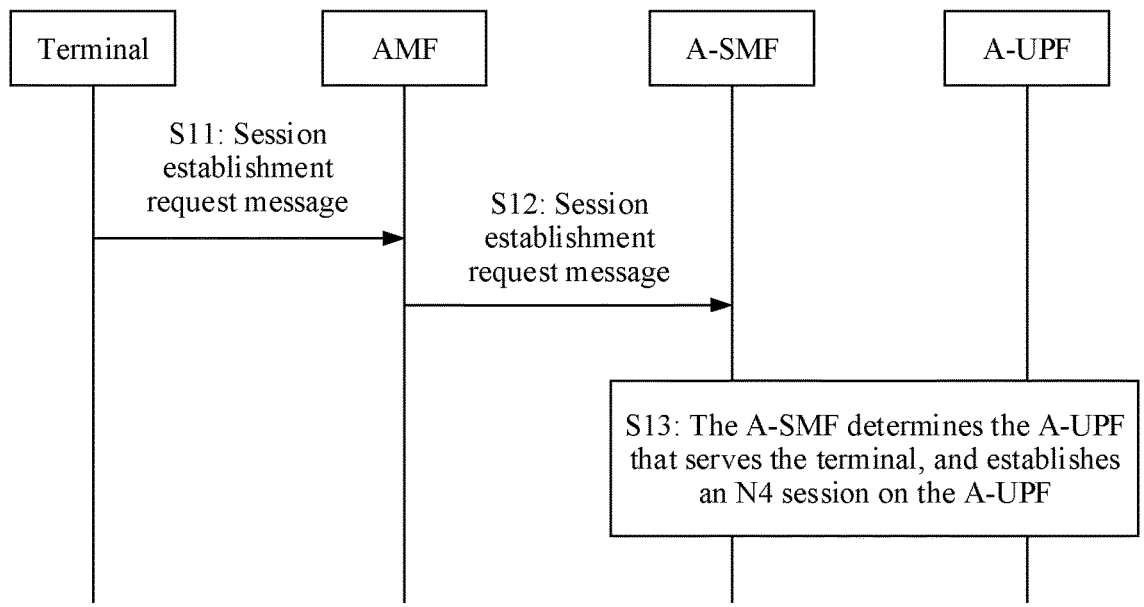
FIG. 3 is a schematic flowchart in which a terminal establishes a session to access a 5G VN service.

FIG. 3 shows a procedure in which a terminal establishes a PDU session to access a 5G VN service. The procedure includes the following steps.

S11: The terminal sends a session establishment request message to an AMF, so that the AMF receives the session establishment request message sent by the terminal.

The session establishment request message is used to request to establish a PDU session. The session establishment request message includes an identifier of the terminal and a 5G VN group identifier.

In this embodiment of this disclosure, the identifier of the terminal in the session establishment request message may include one or more of the following: a subscription permanent identifier (SUPI), a generic public subscription identifier (GPSI), an International Mobile Subscriber Identity (IMSI), a mobile subscriber integrated services digital network (MSISDN), a globally unique temporary identity (GUTI), and a data network-related identifier (for example, a network access identifier (NAI), a specific user identifier of a LAN, an IPV4 address, an IPV6 address, a MAC address, or a MAC address+a VID).

In this embodiment of this disclosure, the 5G VN group identifier may also be referred to as a 5G VN identifier. The 5G VN group identifier is used to determine a corresponding 5G VN group. In other words, one 5G VN group has a unique 5G VN group identifier. The 5G VN group identifier may be a data network name (DNN), a group ID, a DNN+ single network slice selection assistance information (S-NSSAI), or the like.

S12: The AMF sends the session establishment request message to an A-SMF, so that the A-SMF receives the session establishment request message sent by the AMF.

It should be noted that, for a manner in which the AMF selects an SMF for establishing a PDU session, refer to the conventional technology. Details are not described herein.

S13: The A-SMF determines an A-UPF that serves the terminal, and establishes an N4 session on the A-UPF.

It should be noted that, for a manner in which the A-SMF selects an A-UPF that serves the terminal, refer to the conventional technology. Details are not described herein.

In step S13, after determining the A-UPF that serves the terminal, the A-SMF generates a routing rule. Then, the A-SMF sends the routing rule to the A-UPF, so that the A-UPF can install the corresponding routing rule. This ensures that the A-UPF can successfully forward a packet of the 5G VN group.

An example is used for description with reference to FIG. 1. For example, for the terminal 3, UPF2 configures a routing rule 1 corresponding to the terminal 3, and the routing rule 1 is used to send a packet whose destination address information is address information of the terminal 3 to a RAN node 3. In addition, UPF2 configures a routing rule 2 corresponding to the terminal 2 and a routing rule 3 corresponding to the terminal 1. The routing rule 2 is used to send a packet whose destination address information is address information of the terminal 2 to UPF1. The routing rule 3 is used to send a packet whose destination address information is address information of the terminal 1 to UPF1.

According to the procedure shown in FIG. 3, each terminal in a 5G VN may establish a PDU session to access a 5G VN service.

The following first defines some concepts to describe embodiments of this disclosure.

(1) A first terminal may be any online terminal in a 5G VN group. The online terminal is a terminal that has established a PDU session to access the 5G VN service.

(2) A first A-UPF is a user plane anchor of a PDU session of the first terminal.

(3) A first I-UPF is a UPF inserted between an access network device accessed by the first terminal and the first A-UPF when the first terminal moves out of the first A-UPF. The first I-UPF is configured to maintain communication between the first A-UPF and the access network device accessed by the first terminal.

(4) A second A-UPF is an A-UPF other than the first A-UPF in A-UPFs that serve the 5G VN group. The second A-UPF meets the following conditions: 1. The second A-UPF provides an anchor service for a second terminal in the 5G VN group, where the second terminal is located in a service area of the second A-UPF corresponding to the second terminal. 2. The second A-UPF is different from the first A-UPF.

In embodiments of this disclosure, an A-UPF is a UPF that provides an anchor service for a terminal, and the A-UPF may also be referred to as a user plane anchor of a PDU session of the terminal.

(5) The second terminal and the first terminal belong to a same 5G VN group. A user plane anchor of a PDU session of the second terminal is the second A-UPF. In addition, the second terminal is located in the service area of the second A-UPF corresponding to the second terminal. That the second terminal is located in the service area of the second A-UPF corresponding to the second terminal means that a transmission tunnel (the transmission tunnel may be an N3 tunnel) is established between the second A-UPF and an access network device accessed by the second terminal, or the second A-UPF is an N3 termination point of the second terminal, or the second A-UPF is a termination point of a data packet of the second terminal in a radio access network.

(6) A third terminal and the first terminal belong to a same 5G VN group. The third terminal is any terminal other than the first terminal in the 5G VN group served by the first I-UPF. It may be understood that the third terminal is located in a service scope of the first I-UPF. A transmission tunnel is established between an access network device accessed by the third terminal and the first I-UPF. In other words, the first I-UPF is an N3 termination point of the third terminal, or the first I-UPF is a termination point of a data packet of the third terminal in the radio access network.

Figure 11:
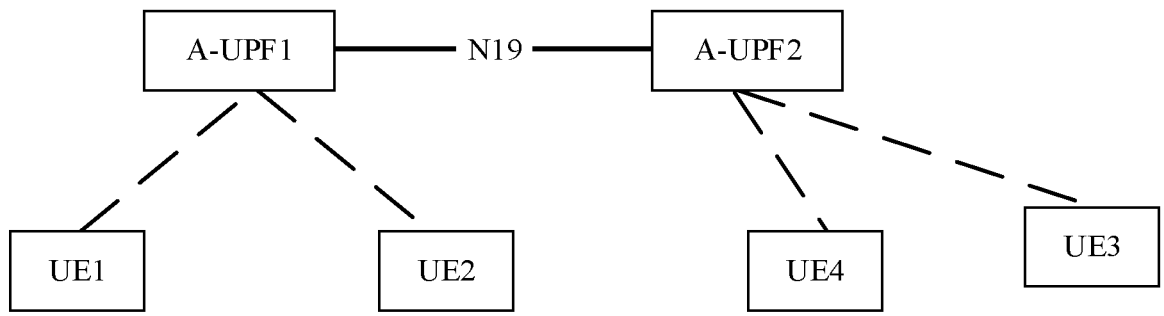
FIG. 11 is a schematic diagram of a system architecture of a 5G VN according to an embodiment of this disclosure.

As shown in FIG. 11, A-UPF1 provides an anchor service for UE1 and UE2, and A-UPF2 provides an anchor service for UE3 and UE4. UE1 and UE2 are located in a service area of A-UPF1, and UE3 and UE4 are located in a service area of A-UPF2.

Because a service scope of a UPF is limited, movement of the first terminal may cause the first terminal to move out of the service scope of the first A-UPF. If the first terminal performs A-UPF handover, the first terminal needs to perform PDU session disconnection, and then performs PDU session re-establishment after the PDU session disconnection. Consequently, service continuity of the first terminal is affected.

To resolve this technical problem, the conventional technology proposes the following solution. When the first terminal moves out of the service scope of the first A-UPF, the first I-UPF is inserted into a user plane path of the first terminal. The first I-UPF is between the access network device connected to the first terminal and the first A-UPF. In this process, because the user plane anchor of the PDU session does not change, the first terminal does not need to perform PDU session disconnection and PDU session re-establishment. This can ensure service continuity of the first terminal.

Figure 12:
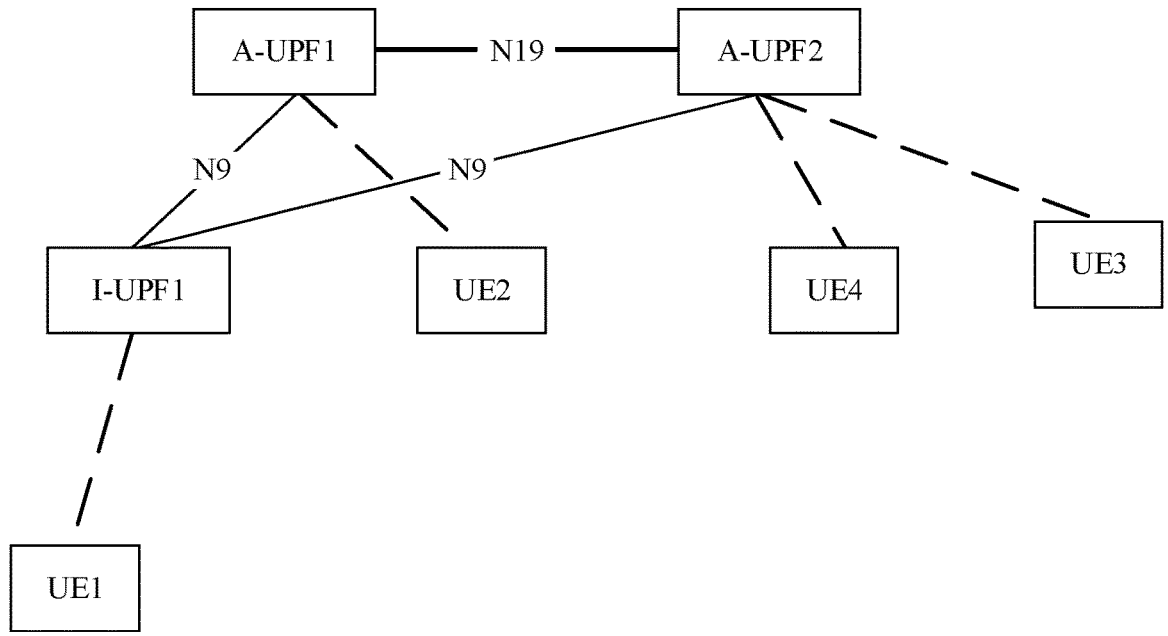
FIG. 12 is a schematic diagram of another system architecture of a 5G VN according to an embodiment of this disclosure.

As shown in FIG. 12, when UE1 moves out of the service area of A-UPF1 due to a location shift, to maintain session continuity of UE1, a network may insert an intermediate UPF (namely, I-UPF1) for UE1. If a transmission tunnel is established between an access network device accessed by UE1 and I-UPF1, it indicates that UE1 is located in a service area of I-UPF1. In this case, UE2 is further located in the service area of A-UPF1, and UE3 and UE4 are further located in the service area of A-UPF2.

Figure 13:
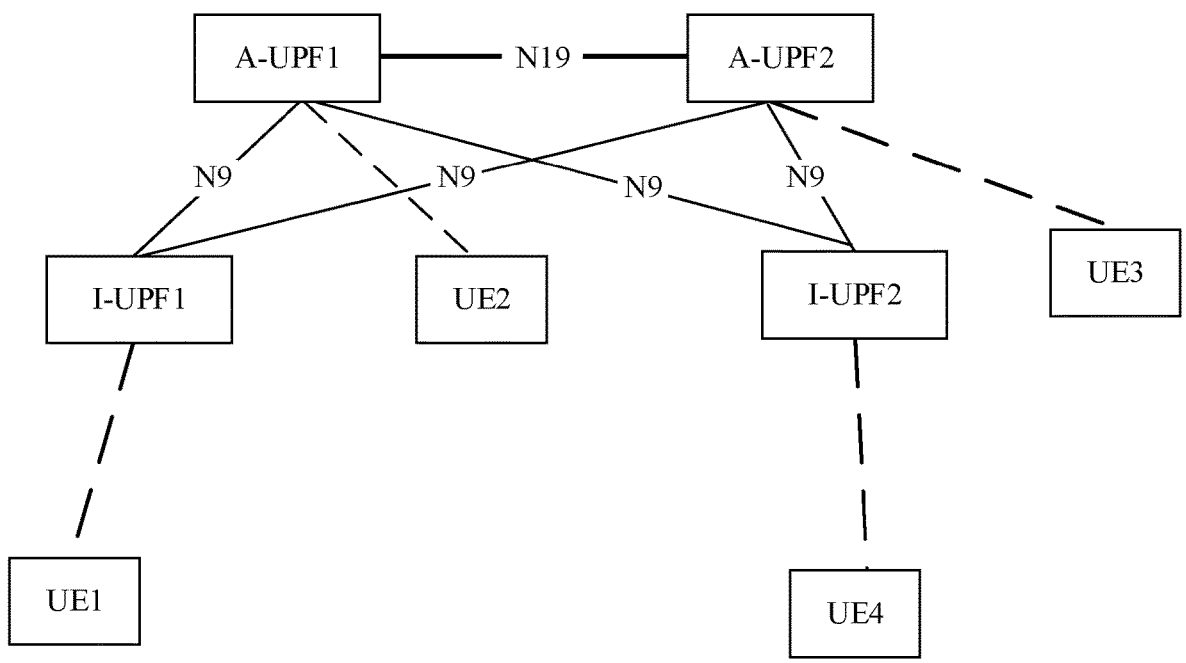
FIG. 13 is a schematic diagram of another system architecture of a 5G VN according to an embodiment of this disclosure.

As shown in FIG. 13, when UE4 moves out of the service area of A-UPF2 due to a location shift, to maintain session continuity of UE4, the network may insert an intermediate UPF (namely, I-UPF2) for UE4. If a transmission tunnel is established between an access network device accessed by UE4 and I-UPF2, it indicates that UE4 is located in a service area of I-UPF2. In this case, UE2 is further located in the service area of A-UPF1, UE3 is further located in the service area of A-UPF2, and UE1 is further located in the service area of I-UPF1.

Figure 14:
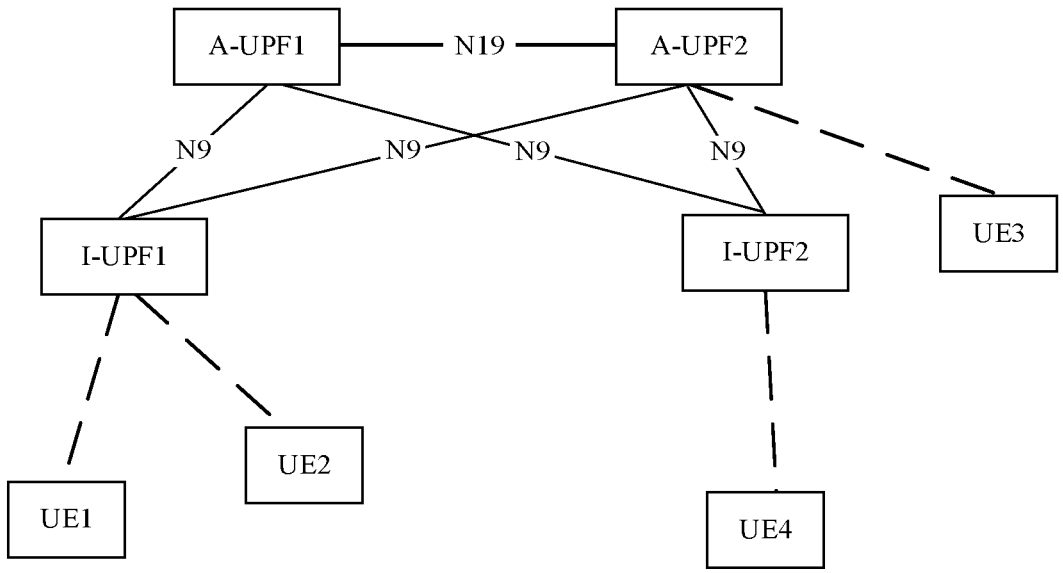
FIG. 14 is a schematic diagram of another system architecture of a 5G VN according to an embodiment of this disclosure.

As shown in FIG. 14, when UE2 moves out of the service area of A-UPF1 due to a location shift, to maintain session continuity of UE2, the network may insert an intermediate UPF for UE2. In this case, the network selects a same I-UPF (namely, I-UPF1) for UE2 and UE1. If a transmission tunnel is established between an access network device accessed by UE2 and I-UPF1, it indicates that UE2 is located in the service area of I-UPF1. In this case, UE1 is further located in the service area of I-UPF1, UE3 is further located in the service area of A-UPF2, and UE4 is further located in the service area of I-UPF2.

When an I-UPF is introduced, the conventional technology provides a system architecture 1 of a 5G VN. A first I-UPF establishes a transmission tunnel with only a first A-UPF in the 5G VN, and does not establish a transmission tunnel with another A-UPF in the 5G VN. For example, a transmission tunnel between an I-UPF and an A-UPF may be an N9 tunnel.

Figure 4:
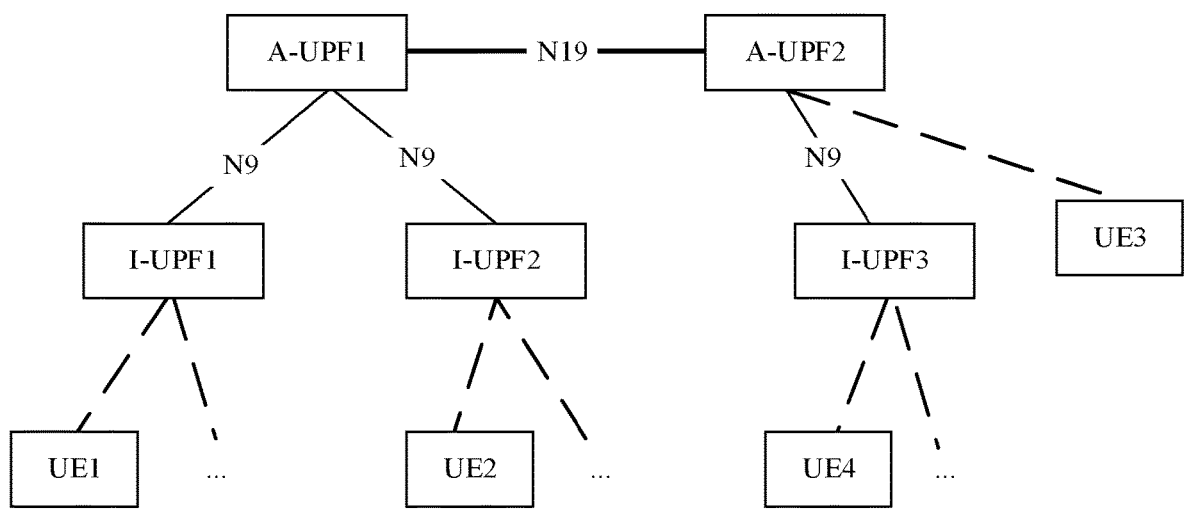
FIG. 4 is a schematic diagram of a system architecture of a 5G VN in the conventional technology.

For example, FIG. 4 is a schematic diagram of the system architecture 1 of the 5G VN according to the conventional technology. In FIG. 4, a user plane anchor of a PDU session of UE1 is A-UPF1, a user plane anchor of a PDU session of UE2 is A-UPF1, a user plane anchor of a PDU session of UE3 is A-UPF2, and a user plane anchor of a PDU session of UE4 is A-UPF2. I-UPF1 is an I-UPF inserted after UE1 moves out of a service scope of A-UPF1, I-UPF2 is an I-UPF inserted after UE2 moves out of the service scope of A-UPF1, and I-UPF3 is an I-UPF inserted after UE4 moves out of a service scope of A-UPF2. I-UPF1 establishes an N9 tunnel with A-UPF1, but does not establish an N9 tunnel with A-UPF2. I-UPF2 establishes an N9 tunnel with A-UPF1, but does not establish an N9 tunnel with A-UPF2.

Figure 5:
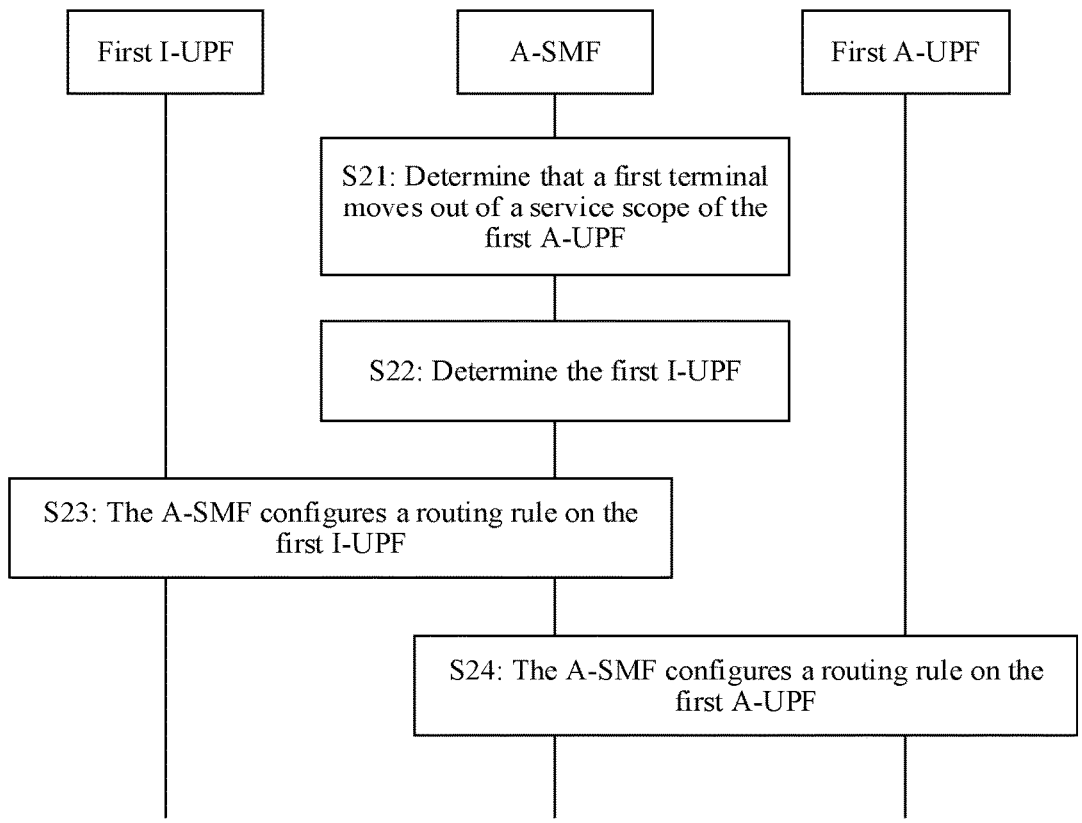
FIG. 5 is a flowchart of a route configuration method for implementing a system architecture of a 5G VN.

A scenario in which a first terminal moves out of a service scope of a first A-UPF but does not move out of a service scope of an A-SMF is used as an example to describe a route configuration method based on the system architecture 1 of the 5G VN. As shown in FIG. 5, the route configuration method includes the following steps.

S21: The A-SMF determines that the first terminal moves out of the service scope of the first A-UPF.

S22: The A-SMF determines a first I-UPF.

S23: The A-SMF configures a routing rule on the first I-UPF.

In a possible implementation, the A-SMF generates a routing rule 1 and a routing rule 2, and sends an N4 session establishment/modification request message to the first I-UPF. The N4 session establishment/modification request message includes the routing rule 1 and the routing rule 2.

In this way, the first I-UPF can install the routing rule 1 and the routing rule 2.

The routing rule 1 is used to forward an uplink packet received by the first I-UPF. Further, the routing rule 1 is a default routing rule. The routing rule 1 is used to send a packet that does not match another routing rule to the first A-UPF. In other words, the routing rule 1 is used to send all uplink packets to the first A-UPF.

The routing rule 2 is used to forward a downlink packet received by the first I-UPF. Further, the routing rule 2 is used to send a packet whose destination address information is address information of the first terminal to an access network device accessed by the first terminal. S24: The A-SMF configures a routing rule on the first A-UPF.

In a possible implementation, the A-SMF generates a routing rule 3, and sends an N4 session modification request message to the first A-UPF. The N4 session modification request message includes the routing rule 3. In this way, the first A-UPF deletes a previous routing rule related to the first terminal, and installs the routing rule 3.

The routing rule 3 is used to send a packet whose destination address information is the address information of the first terminal to the first I-UPF.

According to the route configuration method shown in FIG. 5, an N9 tunnel is established between the first I-UPF and the first A-UPF in the 5G VN, so that the 5G VN can be constructed based on the system architecture 1.

However, the system architecture 1 of the 5G VN has the following disadvantages:

(1) A packet sent by the first terminal to a terminal that uses a second A-UPF as a user plane anchor needs to be transmitted over a relatively long path. Consequently, a packet transmission delay is relatively long, and packet transmission efficiency is affected.

For example, with reference to FIG. 4, if UE1 is the first terminal, A-UPF1 is the first A-UPF, A-UPF2 is the second A-UPF, and UE3 is the terminal that uses the second A-UPF as the user plane anchor. A packet sent by UE1 to UE3 needs to be forwarded by I-UPF1 to A-UPF1, then forwarded by A-UPF1 to A-UPF2, and finally sent by A-UPF2 to UE3 through an access network device accessed by UE3.

(2) A packet sent by the terminal that uses the second A-UPF as the user plane anchor to the first terminal needs to be transmitted over a relatively long path. Consequently, a packet transmission delay is relatively long, and packet transmission efficiency is affected.

For example, with reference to FIG. 4, if UE1 is the first terminal, A-UPF1 is the first A-UPF, A-UPF2 is the second A-UPF, and UE3 is the terminal that uses the second A-UPF as the user plane anchor. A packet sent by UE3 to UE1 needs to be forwarded by A-UPF2 to A-UPF1, then forwarded by A-UPF1 to I-UPF1, and finally sent by I-UPF1 to UE1 through an access network device accessed by UE1.

In conclusion, the system architecture 1 of the 5G VN has technical problems of low efficiency and a relatively long delay of forwarding a packet transmitted between the first terminal and another terminal that uses a second A-UPF as a user plane anchor.

To resolve the foregoing technical problems, an embodiment of this disclosure provides a system architecture 2 of a 5G VN. A transmission tunnel is established between an I-UPF and each A-UPF in the 5G VN.

Figure 6:
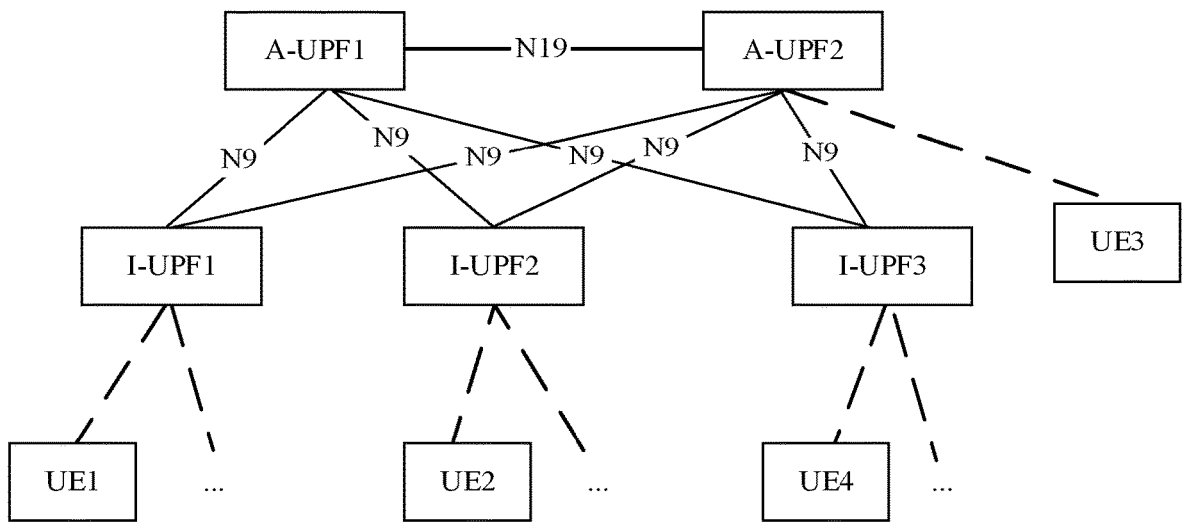
FIG. 6 is a schematic diagram of a system architecture of a 5G VN according to an embodiment of this disclosure.

For example, FIG. 6 is a schematic diagram of the system architecture 2 according to an embodiment of this disclosure. In FIG. 6, a user plane anchor of a PDU session of UE1 is A-UPF1, a user plane anchor of a PDU session of UE2 is A-UPF1, a user plane anchor of a PDU session of UE3 is A-UPF2, and a user plane anchor of a PDU session of UE4 is A-UPF2. I-UPF1 is an I-UPF inserted after UE1 moves out of a service scope of A-UPF1, I-UPF2 is an I-UPF inserted after UE2 moves out of the service scope of A-UPF1, and I-UPF3 is an I-UPF inserted after UE4 moves out of a service scope of A-UPF3. I-UPF1 establishes an N9 tunnel with either of A-UPF1 and A-UPF2. I-UPF2 establishes an N9 tunnel with either of A-UPF1 and A-UPF2. I-UPF3 establishes an N9 tunnel with either of A-UPF1 and A-UPF2.

For example, with reference to FIG. 6, if UE1 is a first terminal, A-UPF1 is a first A-UPF, A-UPF2 is a second A-UPF, and UE3 is a terminal that uses the second A-UPF as a user plane anchor. A packet sent by UE1 to UE3 is directly forwarded by I-UPF1 to A-UPF2, and finally sent by A-UPF2 to UE3 through an access network device accessed by UE3.

For example, with reference to FIG. 6, a packet sent by UE3 to UE1 is directly forwarded by A-UPF2 to I-UPF1, and finally sent by I-UPF1 to UE1 through an access network device accessed by UE1.

It can be learned that, for the disadvantages in the system architecture 1 of the 5G VN, because a transmission tunnel is established between the first I-UPF and each A-UPF in the 5G VN, in other words, there is a transmission tunnel between the first I-UPF and the second A-UPF, a packet can be directly transmitted between the first I-UPF and the second A-UPF, so that a forwarding path for transmitting a packet between a terminal served by the first I-UPF and a terminal served by the second A-UPF can be shortened. This shortens a packet forwarding delay and improves forwarding efficiency.

The following describes a route configuration method used to implement the system architecture 2 of the 5G VN.

According to a first aspect, a first SMF configures a routing rule on a first I-UPF according to the following route configuration method, so that the first I-UPF can normally forward a packet that is sent by a first terminal to another terminal in a 5G VN group.

Figure 7:
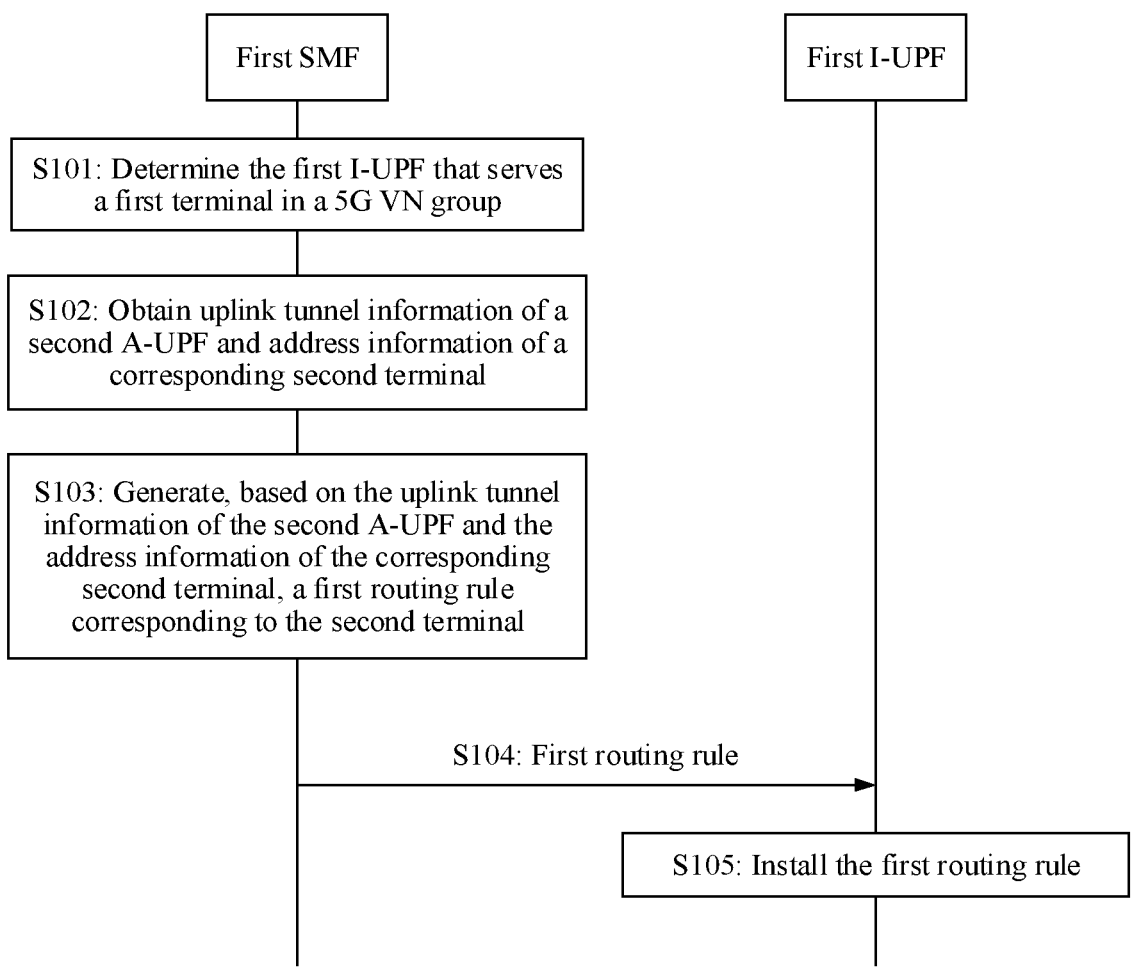
FIG. 7 is a flowchart of a route configuration method according to an embodiment of this disclosure.

FIG. 7 shows the route configuration method according to an embodiment of this disclosure. The method includes the following steps.

S101: The first SMF determines the first I-UPF that serves the first terminal in the 5G VN group.

The first SMF may be an SMF that serves the first terminal after the first terminal moves. The first SMF may be an A-SMF or an I-SMF.

The first I-UPF is configured to maintain communication between a first A-UPF and an access network device accessed by the first terminal. In other words, the first I-UPF may be configured to transmit a packet between the first A-UPF and the access network device accessed by the first terminal.

In a possible implementation, the first SMF may determine the first I-UPF based on factors such as a location of the first terminal, a service scope of each UPF managed by the first SMF, and a service capability of each UPF managed by the first SMF.

Optionally, the first I-UPF may be one of the following two cases: Case 1: The first I-UPF is one of existing I-UPFs in the 5G VN group.

It may be understood that, before the first terminal moves out of a service scope of a UPF that currently serves the first terminal, another terminal in the 5G VN group may move out of a service scope of a UPF that serves the other terminal. In this case, an I-UPF is inserted into a user plane path of the other terminal. Therefore, there may be one or more I-UPFs in the 5G VN.

For example, before a terminal 1 moves out of a service scope of an A-SMF, I-UPF1, I-UPF2, and I-UPF3 already exist in the 5G VN. After the terminal 1 moves out of the service scope of the A-SMF, an AMF selects I-SMF1 to serve the terminal 1, and then I-SMF1 selects existing I-UPF1 to serve the terminal 1. In this case, I-UPF1 is the first I-UPF.

Case 2: The first I-UPF is a newly inserted I-UPF in the 5G VN.

For example, before a terminal 1 moves out of a service scope of an A-SMF, I-UPF1, I-UPF2, and I-UPF3 already exist in the 5G VN. After the terminal 1 moves out of the service scope of the A-SMF, an AMF selects I-SMF1 to serve the terminal 1, and then I-SMF1 inserts I-UPF4 into the 5G VN, and selects I-UPF4 to serve the terminal 1. In this case, I-UPF4 is the first I-UPF.

S102: The first SMF obtains uplink tunnel information of a second A-UPF and address information of a corresponding second terminal.

The uplink tunnel information corresponding to the second A-UPF is used to establish an uplink tunnel between the second A-UPF and the first I-UPF. Optionally, the uplink tunnel information corresponding to the second A-UPF is N9 uplink tunnel information. The N9 uplink tunnel information corresponding to the second A-UPF may correspond to an N9 tunnel at a session granularity, a group granularity, or a device granularity. This is not limited in this embodiment of this disclosure. For example, the N9 uplink tunnel information corresponding to the second A-UPF may include address information and a port number of the second A-UPF.

It may be understood that, for uplink tunnel information of another A-UPF (for example, the first A-UPF), refer to the descriptions of the uplink tunnel information of the second A-UPF. Details are not described below again.

It should be noted that the first SMF may allocate the uplink tunnel information of the second A-UPF to the second A-UPF, or the first SMF may receive the uplink tunnel information of the second A-UPF from the second A-UPF, or the first SMF may receive the uplink tunnel information of the second A-UPF from a second SMF.

In this embodiment of this disclosure, the second SMF may be an SMF that serves the first terminal before the first terminal moves. It should be noted that the second SMF is an A-SMF, and the first SMF is an I-SMF, or the second SMF is a source I-SMF, and the first SMF is a target I-SMF.

The address information of the second terminal is used by another device to address the second terminal. In this embodiment of this disclosure, the address information of the second terminal may be an IPV4 address, an IPV6 address, a MAC address, an international mobile equipment identity (IMEI), an IMSI, a 5G-GUTI, or the like of the second terminal.

It may be understood that, for address information of another terminal (for example, the first terminal), refer to the descriptions of the address information of the second terminal. Details are not described below again.

It should be noted that the first SMF may obtain the address information of the second terminal from a context stored by the first SMF, or the first SMF receives the address information of the second terminal that is sent by the second SMF.

S103: The first SMF generates, based on the uplink tunnel information of the second A-UPF and the address information of the corresponding second terminal, a first routing rule corresponding to the second terminal.

The first routing rule includes the address information of the second terminal and the uplink tunnel information corresponding to the second A-UPF that serves the second terminal. The first routing rule is used to send a packet whose destination address information is the address information of the second terminal to the second A-UPF that serves the second terminal.

For example, the first routing rule may include a first PDR and a first FAR. Destination address information in the first PDR is the address information of the second terminal. The first FAR includes the uplink tunnel information of the second A-UPF that serves the second terminal.

S104: The first SMF sends the first routing rule to the first I-UPF, so that the first I-UPF receives the first routing rule from the first SMF.

In a possible implementation, the first SMF sends an N4 session establishment request message to the first I-UPF. The N4 session establishment request message is used to request to establish an N4 session context corresponding to a PDU session of the first terminal. The N4 session establishment request message includes the first routing rule corresponding to the second terminal.

S105: The first I-UPF installs the first routing rule.

For example, the first routing rule includes the first PDR and the first FAR. After the first I-UPF installs the first routing rule corresponding to the second terminal, when a packet received by the first I-UPF from an ingress matches the first PDR, the first I-UPF forwards the packet from an egress to the second A-UPF according to the first FAR corresponding to the first PDR.

It may be understood that the route configuration method shown in FIG. 7 is applicable to any second terminal. Therefore, the first I-UPF can install a first routing rule corresponding to each second terminal.

According to the technical solution shown in FIG. 7, because the first I-UPF installs the first routing rule corresponding to the second terminal, a packet whose destination address information is the address information of the second terminal served by the second A-UPF may be directly forwarded from the first I-UPF to the second A-UPF, instead of being first sent by the first I-UPF to the first A-UPF and then forwarded from the first A-UPF to the second A-UPF. It can be learned that the technical solution in this disclosure shortens a forwarding path of a packet sent by the first terminal to the second terminal, and therefore shortens a packet forwarding delay and improves forwarding efficiency.

Figure 8:
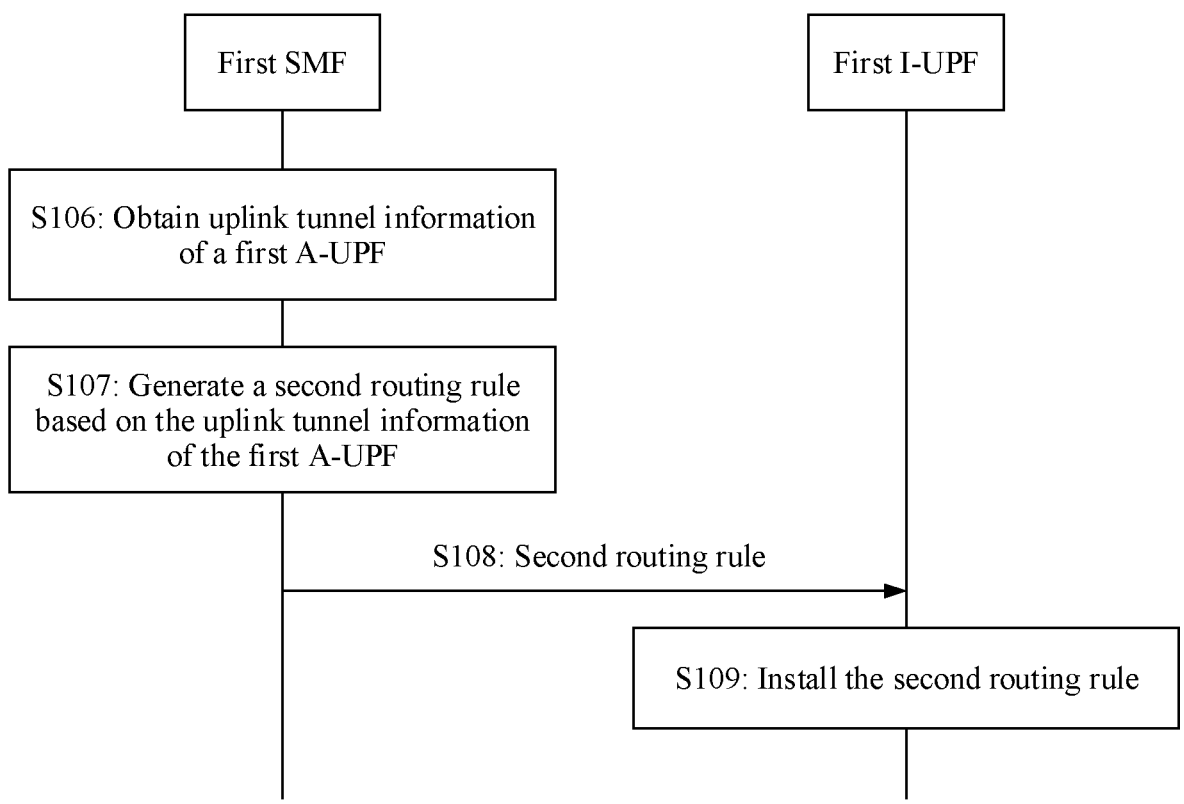
FIG. 8 is a flowchart of another route configuration method according to an embodiment of this disclosure.

On a basis of the technical solution shown in FIG. 7, an embodiment of this disclosure further provides the following route configuration method. As shown in FIG. 8, the route configuration method further includes steps S106 to S109.

S106: The first SMF obtains uplink tunnel information of the first A-UPF.

It should be noted that the first SMF may allocate the uplink tunnel information of the first A-UPF to the first A-UPF, or the first SMF may receive the uplink tunnel information of the first A-UPF that is sent by the first A-UPF, or the first SMF may receive the uplink tunnel information of the first A-UPF that is sent by the second SMF.

S107: The first SMF generates a second routing rule based on the uplink tunnel information of the first A-UPF.

The second routing rule includes the uplink tunnel information of the first A-UPF.

It should be noted that the priority of the second routing rule is lower than the priority of another routing rule other than the second routing rule. The second routing rule is used to send a packet that does not match another routing rule to the first A-UPF. In other words, the second routing rule is a default routing rule.

For example, the other routing rule may be the foregoing first routing rule or the following third routing rule.

For example, the second routing rule may include a second PDR and a second FAR.

Destination address information in the second PDR is set to "unknown." The second FAR includes the uplink tunnel information of the first A-UPF.

S108: The first SMF sends the second routing rule to the first I-UPF, so that the first I-UPF receives the second routing rule sent by the first SMF.

In a possible implementation, the first SMF sends an N4 session establishment request message to the first I-UPF. The N4 session establishment request message is used to request to establish an N4 session context corresponding to a PDU session of the first terminal. The N4 session establishment request message includes the second routing rule.

S109: The first I-UPF installs the second routing rule.

For example, the second routing rule includes the second PDR and the second FAR. After the first I-UPF installs the second routing rule, when a packet received by the first I-UPF from the ingress does not match another PDR, the first I-UPF determines that the packet matches the second PDR. Therefore, the first I-UPF forwards the packet from the egress to the first A-UPF according to the second FAR corresponding to the second PDR.

It should be noted that a sequence of performing steps S102 to S105 and steps S106 to S109 is not limited in this embodiment of this disclosure. To be specific, steps S102 to S105 may be performed before steps S106 to S109, or steps S106 to S109 may be performed before steps S102 to S105, or steps S106 to S109 may be performed simultaneously with steps S102 to S105.

According to the technical solution shown in FIG. 8, because the first I-UPF installs the second routing rule, it can be ensured that the first I-UPF can normally forward a packet that is sent to another terminal other than the second terminal.

Figure 9:
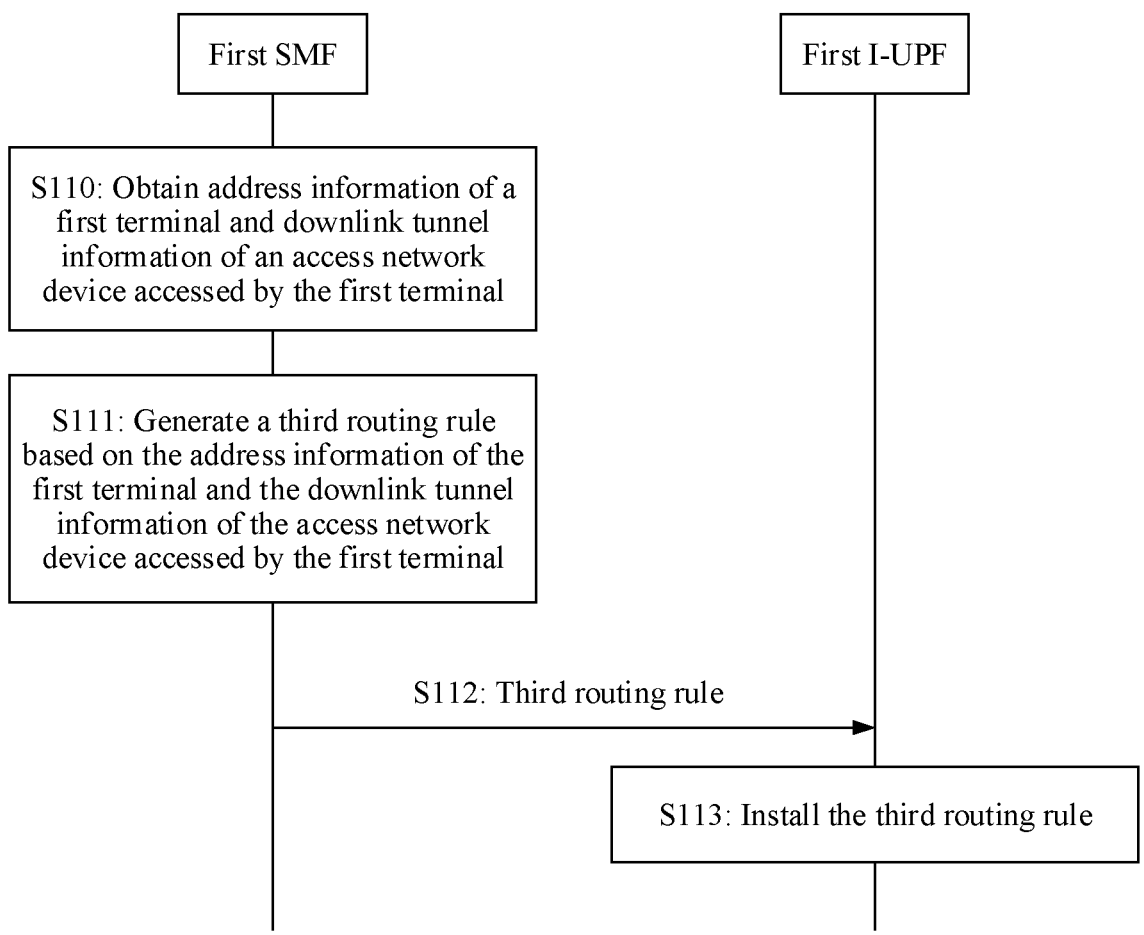
FIG. 9 is a flowchart of another route configuration method according to an embodiment of this disclosure.

On a basis of the technical solution shown in FIG. 7, an embodiment of this disclosure further provides the following route configuration method. As shown in FIG. 9, the route configuration method further includes steps S110 to S113.

S110: The first SMF obtains address information of the first terminal and downlink tunnel information of the access network device accessed by the first terminal.

It should be noted that the first SMF may obtain the address information of the first terminal from the context stored by the first SMF, or the first SMF may receive the address information of the first terminal that is sent by the second SMF.

The downlink tunnel information of the access network device accessed by the first terminal is used to establish a downlink tunnel between the first I-UPF and the access network device accessed by the first terminal. Optionally, the downlink tunnel information of the access network device accessed by the first terminal may be N3 downlink tunnel information. For example, the N3 downlink tunnel information may include address information and a port number of the access network device accessed by the first terminal.

It may be understood that, for details about downlink tunnel information of an access network device accessed by another terminal (for example, a third terminal), refer to the descriptions of the downlink tunnel information of the access network device accessed by the first terminal. Details are not described below again.

It should be noted that the first SMF may obtain, from the AMF, the tunnel information of the access network device accessed by the first terminal.

S111: The first SMF generates, based on the address information of the first terminal and the downlink tunnel information of the access network device accessed by the first terminal, a third routing rule corresponding to the first terminal.

The third routing rule includes the address information of the first terminal and the downlink tunnel information of the access network device accessed by the first terminal. The third routing rule is used to send a packet whose destination address information is the address information of the first terminal to the access network device accessed by the first terminal.

For example, the third routing rule includes a third PDR and a third FAR. The third PDR includes the address information of the first terminal. The third FAR includes the downlink tunnel information of the access network device accessed by the first terminal.

S112: The first SMF sends the third routing rule to the first I-UPF, so that the first I-UPF receives the third routing rule sent by the first SMF.

In a possible implementation, the first SMF sends an N4 session establishment request message to the first I-UPF. The N4 session establishment request message includes the third routing rule.

S113: The first I-UPF installs the third routing rule.

For example, the third routing rule includes the third PDR and the third FAR. After the first I-UPF installs the third routing rule, when a packet received by the first I-UPF from the ingress matches the third PDR, the first I-UPF forwards, according to the third FAR corresponding to the third PDR, the packet from the egress to the access network device accessed by the first terminal.

It should be noted that a sequence of performing steps S102 to S105 and steps S110 to S113 is not limited in this embodiment of this disclosure. To be specific, steps S102 to S105 may be performed before steps S110 to S113, or steps S110 to S113 may be performed before steps S102 to S105, or steps S110 to S113 may be performed simultaneously with steps S102 to S105.

According to the technical solution shown in FIG. 9, after installing the third routing rule, the first I-UPF may forward, to the access network device accessed by the first terminal, a received packet that is to be sent to the first terminal.

According to a second aspect, for each A-UPF, an A-SMF configures a routing rule on the A-UPF according to the following route configuration method, so that the A-UPF can normally forward a packet that is sent by another terminal in the 5G VN group to a first terminal.

Figure 10:
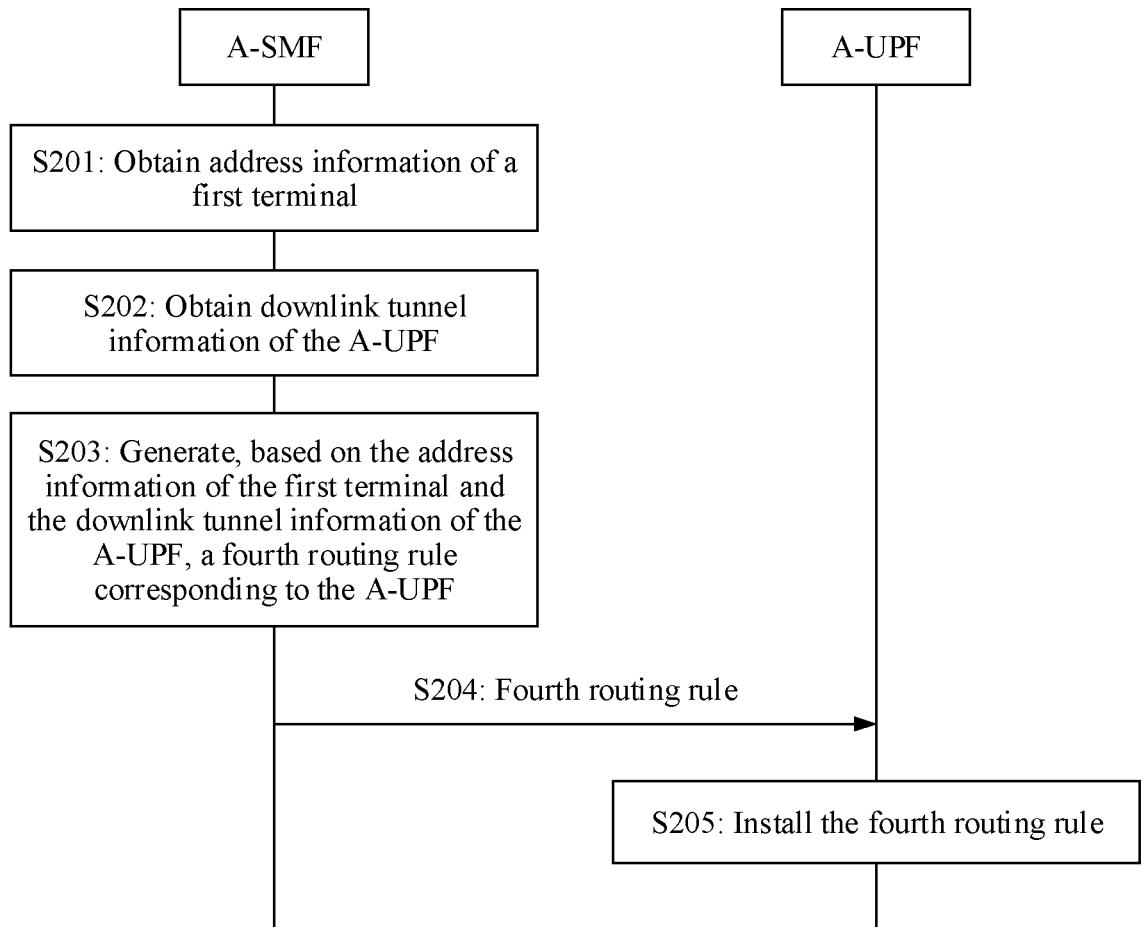
FIG. 10 is a flowchart of another route configuration method according to an embodiment of this disclosure.

FIG. 10 shows the route configuration method according to an embodiment of this disclosure. The method includes the following steps.

S201: The A-SMF obtains address information of the first terminal.

In a possible implementation, the A-SMF obtains the address information of the first terminal from a context stored by the A-SMF.

S202: The A-SMF obtains downlink tunnel information of the A-UPF.

The downlink tunnel information of the A-UPF is used to establish a downlink tunnel between the A-UPF and a first I-UPF. Optionally, the downlink tunnel information of the A-UPF may be N9 downlink tunnel information. For example, the N9 downlink tunnel information of the A-UPF may include address information and a port number of the first I-UPF.

In a possible implementation, when the A-SMF and the first SMF are a same SMF, the A-SMF may allocate the downlink tunnel information of the A-UPF, or the A-SMF receives the downlink tunnel information of the A-UPF that is sent by the first I-UPF.

In another possible implementation, when the A-SMF and the first SMF are not a same SMF, the A-SMF receives the downlink tunnel information of the A-UPF that is sent by the first SMF.

S203: The A-SMF generates, based on the address information of the first terminal and the downlink tunnel information of the A-UPF, a fourth routing rule corresponding to the A-UPF.

The fourth routing rule includes the address information of the first terminal and the downlink tunnel information of the A-UPF. The fourth routing rule is used to send a packet whose destination address information is the address information of the first terminal to the first I-UPF.

For example, the fourth routing rule includes a fourth PDR and a fourth FAR.

Destination address information in the fourth PDR is the address information of the first terminal. The fourth FAR includes the downlink tunnel information of the A-UPF.

S204: The A-SMF sends the fourth routing rule to the A-UPF, so that the A-UPF receives the fourth routing rule sent by the A-SMF.

In a possible implementation, the A-SMF sends an N4 session modification request message to the A-UPF. The N4 session modification request message includes the fourth routing rule.

S205: The A-UPF installs the fourth routing rule.

For example, the fourth routing rule includes the fourth PDR and the fourth FAR. After the A-UPF installs the fourth routing rule, when a packet received by the A-UPF from an ingress matches the fourth PDR, the A-UPF forwards the packet from an egress to the first I-UPF according to the fourth FAR.

It should be noted that the A-UPF configures a routing rule related to the first terminal before the first terminal moves. The routing rule related to the first terminal is not applicable to the first terminal after the first terminal moves out of a service scope of the A-SMF. Therefore, the A-UPF deletes the previously configured routing rule related to the first terminal. The routing rule related to the first terminal is a routing rule used to forward a packet whose destination address information is the address information of the first terminal.

According to the technical solution shown in FIG. 10, when the A-UPF is a second A-UPF, after the second A-UPF installs the fourth routing rule, a packet whose destination address information is the address information of the first terminal may be directly forwarded from the second A-UPF to the first I-UPF, instead of being first forwarded from the second A-UPF to the first A-UPF and then forwarded from the first A-UPF to the first I-UPF. It can be learned that the technical solution in this disclosure shortens the forwarding path of a packet sent by a terminal served by the second A-UPF to the first terminal, and therefore shortens a packet forwarding delay and improves forwarding efficiency.

By using an example, the following describes the route configuration method provided in this embodiment of this disclosure.

As shown in FIG. 11, the user plane anchor of the PDU session of UEL is A-UPF1, the user plane anchor of the PDU session of UE2 is A-UPF1, the user plane anchor of the PDU session of UE3 is A-UPF2, and the user plane anchor of the PDU session of UE4 is A-UPF2.

Routing rules configured on A-UPF1 include a routing rule 1-1, a routing rule 1-2, a routing rule 1-3, and a routing rule 1-4. The routing rule 1-1 is used to send a packet whose destination address information is address information of UE1 to an access network device accessed by UE1. The routing rule 1-2 is used to send a packet whose destination address information is address information of UE2 to an access network device accessed by UE2. The routing rule 1-3 is used to send a packet whose destination address information is address information of UE3 to A-UPF2. The routing rule 1-4 is used to send a packet whose destination address information is address information of UE4 to A-UPF2.

Routing rules configured on A-UPF2 include a routing rule 2-1, a routing rule 2-2, a routing rule 2-3, and a routing rule 2-4. The routing rule 2-1 is used to send a packet whose destination address information is the address information of UE3 to an access network device accessed by UE3. The routing rule 2-2 is used to send a packet whose destination address information is the address information of UE4 to an access network device accessed by UE4. The routing rule 2-3 is used to send a packet whose destination address information is the address information of UE1 to A-UPF1. The routing rule 2-4 is used to send a packet whose destination address information is the address information of UE2 to A-UPF1.

Then, as shown in FIG. 12, because UE1 moves out of a service scope of A-UPF1, I-UPF1 is inserted into a user plane path of UE1. It may be understood that, in this case, if UE1 is the first terminal, UE3 and UE4 may be considered as second terminals.

The first SMF configures a routing rule for I-UPF1. Therefore, an N4 context corresponding to a PDU session of UE1 on I-UPF1 includes a routing rule 3-1, a routing rule 3-2, a routing rule 3-3, and a routing rule 3-4. The routing rule 3-1 is used to send a packet whose destination address information is the address information of UE3 to A-UPF2. The routing rule 3-2 is used to send a packet whose destination address information is the address information of UE4 to A-UPF2. The routing rule 3-3 is used to send a packet whose destination address information is the address information of UE1 to the access network device accessed by UE1. The routing rule 3-4 is a default routing rule and is used to send a packet that does not match another routing rule to A-UPF1.

In addition, the A-SMF configures a routing rule for A-UPF1. Further, A-UPF1 deletes the previous routing rule 1-1, and installs a routing rule 1-5. In this case, routing rules configured on A-UPF1 include the routing rule 1-2, the routing rule 1-3, the routing rule 1-4, and the routing rule 1-5. The routing rule 1-5 is used to send a packet whose destination address information is the address information of UE1 to I-UPF1.

The A-SMF configures a routing rule for A-UPF2. Further, A-UPF2 deletes the previous routing rule 2-3, and installs a routing rule 2-5. In this case, routing rules configured on A-UPF2 include the routing rule 2-1, the routing rule 2-2, the routing rule 2-4, and the routing rule 2-5. The routing rule 2-5 is used to send a packet whose destination address information is the address information of UE1 to I-UPF1.

Then, as shown in FIG. 13, because UE4 moves out of a service scope of A-UPF2, I-UPF2 is inserted into a user plane path of UE4. It may be understood that, in this case, if UE4 is the first terminal, UE2 may be considered as the second terminal.

The first SMF configures a routing rule for I-UPF2. Therefore, an N4 context corresponding to a PDU session of UE4 on I-UPF2 includes a routing rule 4-1, a routing rule 4-2, and a routing rule 4-3. The routing rule 4-1 is used to send a packet whose destination address information is the address information of UE2 to A-UPF1. The routing rule 4-2 is used to send a packet whose destination address information is the address information of UE4 to the access network device accessed by UE4. The routing rule 4-3 is a default routing rule and is used to send a packet that does not match another routing rule to A-UPF2.

In addition, the A-SMF configures a routing rule for A-UPF1. Further, A-UPF1 deletes the previous routing rule 1-4, and installs a routing rule 1-6. In this case, routing rules configured on A-UPF1 include the routing rule 1-2, the routing rule 1-3, the routing rule 1-5, and the routing rule 1-6. The routing rule 1-6 is used to send a packet whose destination address information is the address information of UE4 to I-UPF2.

The A-SMF configures a routing rule for A-UPF2. Further, A-UPF2 deletes the previous routing rule 2-2, and installs a routing rule 2-6. In this case, routing rules configured on A-UPF2 include the routing rule 2-1, the routing rule 2-4, the routing rule 2-5, and the routing rule 2-6. The routing rule 2-6 is used to send a packet whose destination address information is the address information of UE4 to I-UPF2.

Then, as shown in FIG. 14, because UE2 moves out of the service scope of A-UPF1, I-UPF1 is inserted into a user plane path of UE2. It may be understood that, in this case, if UE2 is the first terminal, UE3 may be considered as the second terminal, and UE1 may be considered as a third terminal.

The first SMF configures a routing rule for I-UPF1. Therefore, an N4 session context corresponding to a PDU session of UE2 on I-UPF1 includes a routing rule 5-1, a routing rule 5-2, and a routing rule 5-3. The routing rule 5-1 is used to send a packet whose destination address information is the address information of UE3 to A-UPF2. The routing rule 5-2 is used to send a packet whose destination address information is the address information of UE2 to the access network device accessed by UE2. The routing rule 5-3 is a default routing rule and is used to send a packet that does not match another routing rule to A-UPF1.

In addition, the A-SMF configures a routing rule for A-UPF1. Further, A-UPF1 deletes the previous routing rule 1-2, and installs a routing rule 1-7. In this case, routing rules configured on A-UPF1 include the routing rule 1-3, the routing rule 1-5, the routing rule 1-6, and the routing rule 1-7. The routing rule 1-7 is used to send a packet whose destination address information is the address information of UE2 to I-UPF1.

The A-SMF configures a routing rule for A-UPF2. Further, A-UPF2 deletes the previous routing rule 2-4, and installs a routing rule 2-7. In this case, routing rules configured on A-UPF2 include the routing rule 2-1, the routing rule 2-5, the routing rule 2-6, and the routing rule 2-7. The routing rule 2-7 is used to send a packet whose destination address information is the address information of UE2 to I-UPF1.

Furthermore, regardless of whether the 5G VN uses the system architecture 1 or the system architecture 2, according to the route configuration methods provided above, if the first I-UPF inserted into the user plane path of the first terminal further serves the third terminal, the routing rule configured on the first I-UPF cannot support local handover between the first terminal and the third terminal.

For example, as shown in FIG. 14, a packet sent by UE1 to UE2 is transmitted in the following manner: I-UPF1 receives, from the access network device accessed by UE1, a packet whose destination address information is the address information of UE2. Because none of the routing rule 3-1, the routing rule 3-2, and the routing rule 3-3 that are in the N4 session context corresponding to the PDU session of UEL and that are stored in I-UPF1 matches the packet, I-UPF1 forwards the packet to A-UPF1 according to the routing rule 3-4. Then, A-UPF1 forwards the packet to I-UPF1 according to the routing rules 1-7. I-UPF1 forwards, according to the routing rule 5-2, the packet to the access network device accessed by UE2.

It can be learned that when the first I-UPF does not support a local handover function, a packet to be transmitted between two terminals on the first I-UPF needs to pass through a relatively long forwarding path. This increases the packet forwarding delay.

Figure 15:
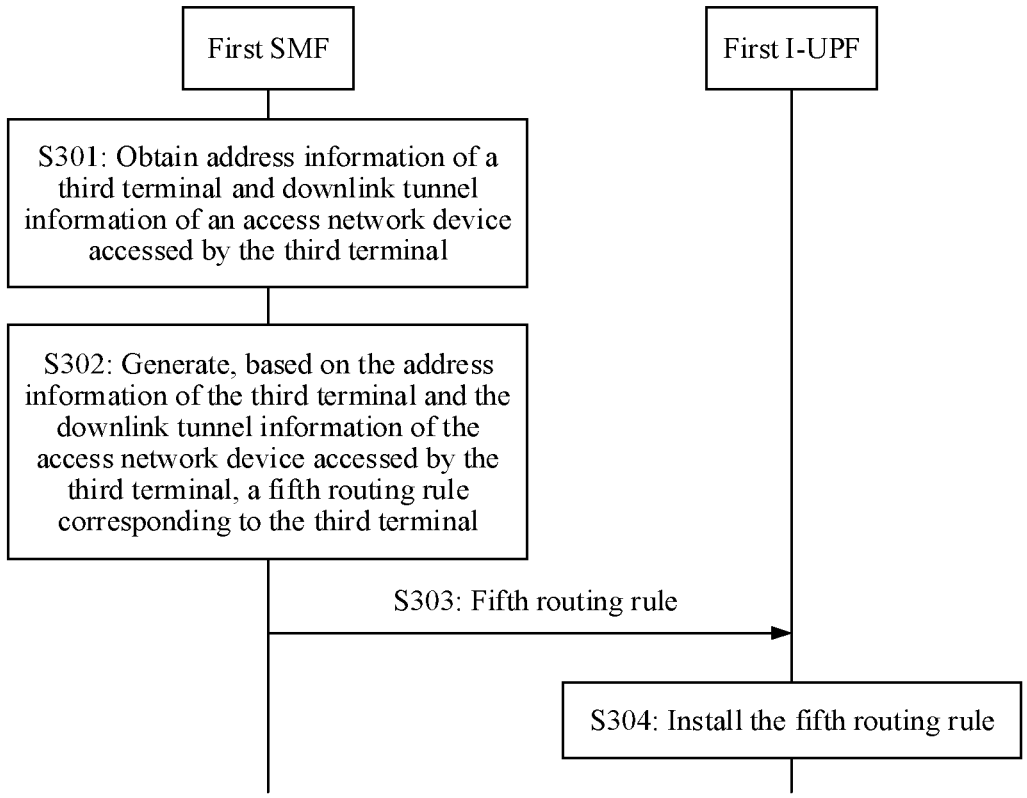
FIG. 15 is a flowchart of another route configuration method according to an embodiment of this disclosure.

Therefore, in addition to the technical solutions shown in FIG. 7, FIG. 8, and FIG. 9, an embodiment of this disclosure provides a route configuration method shown in FIG. 15, to configure a routing rule on a first I-UPF, so that the routing rule configured on the first I-UPF can support the first I-UPF in implementing the local handover function. The route configuration method is applicable to each third terminal. Further, as shown in FIG. 15, the route configuration method includes the following steps.

S301: A first SMF obtains address information of a third terminal and downlink tunnel information of an access network device accessed by the third terminal.

The downlink tunnel information of the access network device accessed by the third terminal is used to establish a downlink tunnel between the first I-UPF and the access network device accessed by the third terminal. For example, the downlink tunnel information of the access network device accessed by the third terminal is N3 downlink tunnel information. The downlink tunnel information of the access network device accessed by the third terminal may include address information and a port number of the access network device accessed by the third terminal.

In a possible implementation, the first SMF obtains, from a context stored by the first SMF, the address information of the third terminal and the downlink tunnel information of the access network device accessed by the third terminal.

In another possible implementation, the first SMF receives the address information of the third terminal that is sent by a second SMF and the downlink tunnel information of the access network device accessed by the third terminal.

S302: The first SMF generates, based on the address information of the third terminal and the downlink tunnel information of the access network device accessed by the third terminal, a fifth routing rule corresponding to the third terminal.

The fifth routing rule includes the address information of the third terminal and the downlink tunnel information of the access network device accessed by the third terminal. The fifth routing rule is used to send a packet whose destination address information is the address information of the third terminal to the access network device accessed by the third terminal.

For example, the fifth routing rule includes a fifth PDR and a fifth FAR. The fifth PDR includes the address information of the third terminal. The fifth FAR includes the downlink tunnel information of the access network device accessed by the third terminal.

S303: The first SMF sends the fifth routing rule to the first I-UPF, so that the first I-UPF receives the fifth routing rule sent by the first SMF.

In a possible implementation, the first SMF sends an N4 session establishment request message to the first I-UPF. The N4 session establishment request message includes the fifth routing rule.

S304: The first I-UPF installs the fifth routing rule.

In a possible implementation, the first I-UPF installs, in an N4 context corresponding to a PDU session of a first terminal, the fifth routing rule corresponding to the third terminal.

According to the technical solution shown in FIG. 15, because the first I-UPF installs the fifth routing rule corresponding to the third terminal, a packet sent by the first terminal to the third terminal may be directly forwarded by the first I-UPF to the access network device accessed by the third terminal, instead of being first forwarded by the first I-UPF to a first A-UPF, then forwarded by the first A-UPF to the first I-UPF, and finally forwarded by the first I-UPF to the access network device accessed by the third terminal. It can be learned that the technical solution in this disclosure can help reduce forwarding nodes on a forwarding path of a packet sent by the first terminal to the third terminal, and therefore can shorten the packet forwarding delay and improve forwarding efficiency.

In addition, to enable a packet sent by the third terminal to the first terminal to be transmitted through local handover in the first I-UPF, during specific implementation of step S113, the first terminal further installs, on the first I-UPF in an N4 session context corresponding to a PDU session of the third terminal, a third routing rule used for uplink packet transmission.

An example is used to describe a route configuration of the first I-UPF when the local handover function is supported. For example, based on the system architecture shown in FIG. 14, I-UPF1 serves as the first I-UPF. An N4 context corresponding to a PDU session of UE1 on I-UPF1 includes a routing rule 3-1, a routing rule 3-2, a routing rule 3-3, a routing rule 3-4, and a routing rule 3-5. The routing rule 3-5 is used to send a packet whose destination address information is address information of UE2 to an access network device accessed by UE2. An N4 context corresponding to a PDU session of UE2 on I-UPF1 includes a routing rule 5-1, a routing rule 5-2, a routing rule 5-3, and a routing rule 5-4. The routing rule 5-4 is used to send a packet whose destination address information is address information of UE1 to an access network device accessed by UE1.

With reference to different application scenarios, the following describes a route configuration method based on the system architecture 2.

Scenario 1: Before the first terminal moves, the first terminal is located in a service scope of the A-SMF, and the A-SMF serves the first terminal. After the first terminal moves, the first terminal moves out of the service scope of the A-SMF.

It may be understood that a service scope of an SMF is usually greater than or equal to a service scope of a UPF managed by the SMF. Therefore, after the first terminal moves out of the service scope of the A-SMF, it may be assumed that the first terminal moves out of a service scope of a UPF that currently serves the first terminal.

Figure 16:
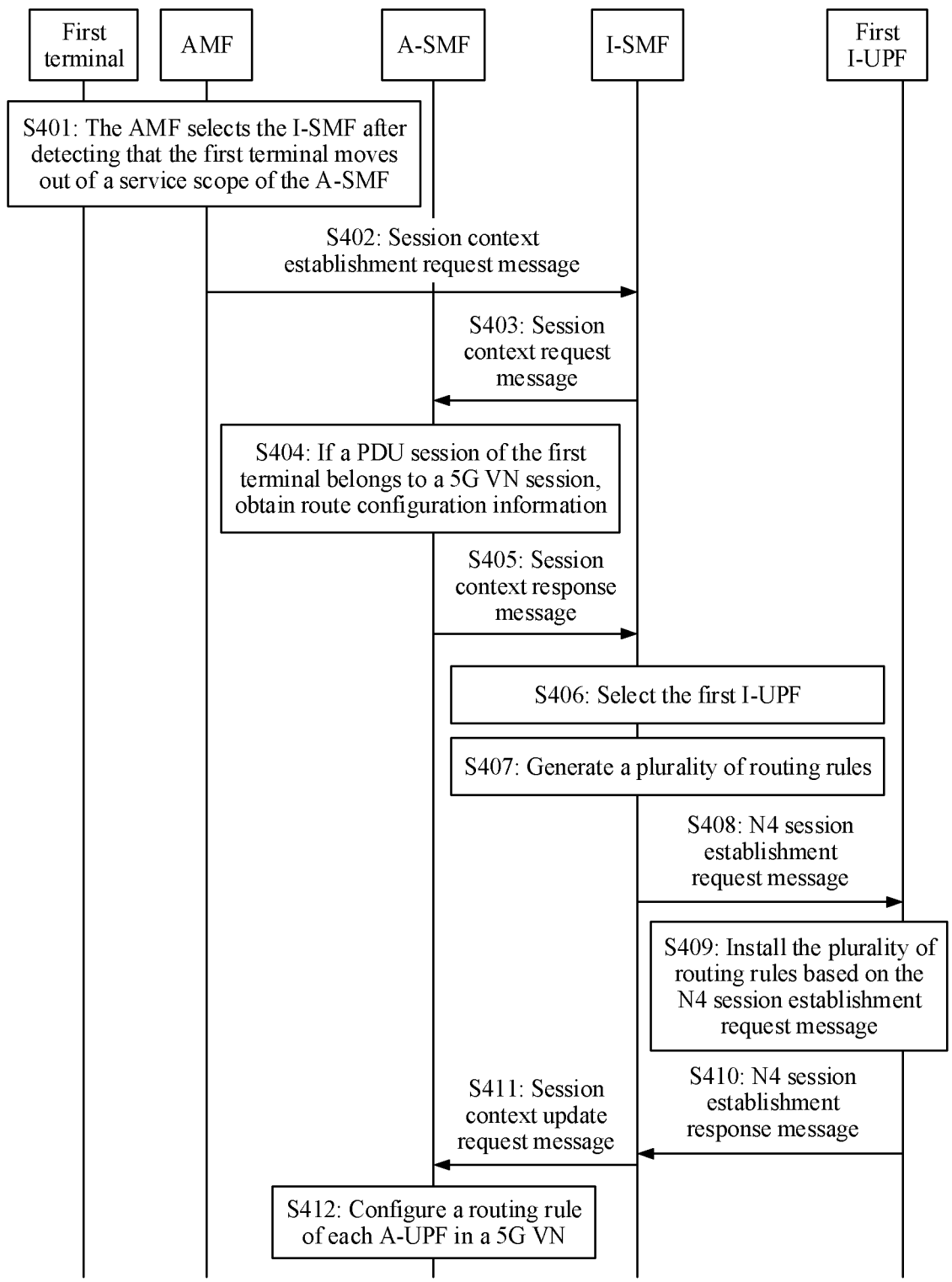
FIG. 16 is a flowchart of another route configuration method according to an embodiment of this disclosure.

Based on the scenario 1, FIG. 16 shows a route configuration method according to an embodiment of this disclosure. It should be noted that, in the technical solution shown in FIG. 16, an I-SMF is configured to implement a function of the foregoing first SMF, and an A-SMF is configured to implement a function of the foregoing second SMF. The route configuration method includes the following steps.

S401: An AMF selects the I-SMF after detecting that the first terminal moves out of a service scope of the A-SMF.

In a possible implementation, the AMF monitors a location of the first terminal. When the location of the first terminal is outside the service scope of the A-SMF, the AMF selects, based on the location of the first terminal and a service scope of each SMF, the I-SMF that serves the first terminal.

It should be noted that a specific implementation in which the AMF monitors the location of the first terminal may be as follows. The AMF periodically obtains location information reported by the first terminal. Optionally, the location information of the first terminal may be longitude and latitude information, a cell identifier, a tracking area identity, or the like.

For example, SMF1 is responsible for managing each A-UPF in a 5G VN. After a terminal 1 moves out of a service scope of SMF1, if the AMF detects that the terminal 1 moves into a service scope of SMF2, the AMF may select SMF2 as an I-SMF that serves the terminal 1.

S402: The AMF sends a session context establishment request message to the I-SMF, so that the I-SMF receives the session context establishment request message sent by the AMF.

The session context establishment request message is used to request the I-SMF to establish a context of a PDU session of the first terminal.

In this embodiment of this disclosure, the session context establishment request includes that a message 1 includes an identifier of a first PDU session. It should be noted that PDU session identifiers are in a one-to-one correspondence with PDU sessions. In other words, one PDU session identifier is used to determine a unique PDU session.

S403: The I-SMF sends a session context request message to the A-SMF, so that the A-SMF receives the session context request message.

The session context request message is used to request the context of the PDU session of the first terminal. The session context request message includes an identifier of the PDU session of the first terminal.

S404: If the PDU session of the first terminal belongs to a 5G VN session, the A-SMF obtains route configuration information.

The route configuration information is used to enable the I-SMF to generate a routing rule.

In a possible implementation, because the A-SMF prestores a correspondence between a PDU session identifier and a 5G VN identifier, the A-SMF determines, through searching based on the identifier of the first PDU session that is carried in the session context request message, whether there is a corresponding 5G VN. If the A-SMF can find the 5G VN corresponding to the identifier of the first PDU session, the A-SMF may determine that the first PDU session belongs to the 5G VN session. In this case, the A-UPF obtains corresponding route configuration information.

For example, the correspondence between a PDU session identifier and a 5G VN may be shown in Table 1.

TABLE 1

| PDU session identifier | 5G VN ID |
|---|---|
| PDU session ID 1 | 5G VN ID 1 |
| PDU session ID 2 | 5G VN ID 2 |
| . . . | . . . |

In this embodiment of this disclosure, the route configuration information includes configuration information of each A-UPF that serves a 5G VN group.

The configuration information of the A-UPF includes at least uplink tunnel information of the A-UPF. It should be noted that the uplink tunnel information corresponding to the A-UPF may reuse existing uplink tunnel information, or the uplink tunnel information corresponding to the A-UPF may be newly allocated uplink tunnel information. If the uplink tunnel information corresponding to the A-UPF may be newly allocated uplink tunnel information, the uplink tunnel information corresponding to the A-UPF may be allocated by the A-SMF, or may be allocated by the A-UPF. It may be understood that, when the uplink tunnel information corresponding to the A-UPF is allocated by the A-UPF, the A-SMF obtains, from the A-UPF, the uplink tunnel information corresponding to the A-UPF.

For a second A-UPF, configuration information of the second A-UPF further includes address information of each second terminal served by the second A-UPF.

Optionally, when an I-UPF exists in the 5G VN, the route configuration information may further include configuration information of each I-UPF in the 5G VN. The configuration information of the I-UPF includes information about each terminal served by the I-UPF. The information about the terminal includes address information of the terminal and downlink tunnel information of an access network device accessed by the terminal.

Optionally, the route configuration information may further include address information of the first terminal.

It should be noted that a context pre-stored by the A-SMF includes topology information of the 5G VN group. Optionally, the topology information of the 5G VN group is used to indicate configuration information of a terminal in the 5G VN group. The configuration information of the terminal may include one or more of the following: address information of the terminal, downlink tunnel information of an access network device accessed by the terminal, an identifier of a UPF that serves the terminal, and an identifier of an A-UPF corresponding to a PDU session of the terminal.

For example, the topology information of the 5G VN group may be shown in Table 2.

TABLE 2

| 5G VN ID | Identifier of the terminal | Address information of the terminal | Downlink tunnel information of the access network device accessed by the terminal | Identifier of the UPF that serves the terminal | Identifier of the A-UPF corresponding to the PDU session of the terminal |
|---|---|---|---|---|---|
| 5G VN ID 1 | Identifier of the terminal 1 | IP address 1 | N3 downlink tunnel information 1 | Identifier of UPF1 | Identifier of UPF1 |
| 5G VN ID 1 | Identifier of a terminal 2 | IP address 2 | N3 downlink tunnel information 2 | Identifier of UPF2 | Identifier of UPF2 |
| 5G VN ID 1 | Identifier of a terminal 3 | IP address 3 | N3 downlink tunnel information 3 | Identifier of UPF3 | Identifier of UPF4 |
| ... | ... | ... | ... | ... | ... |

It may be understood that, for a terminal, if a UPF that serves the terminal and an A-UPF corresponding to a PDU session of the terminal are not a same UPF, it indicates that the UPF that serves the terminal is an I-UPF.

In this embodiment of this disclosure, the A-SMF may determine, based on the topology information of the 5G VN group, address information of each second terminal served by the second A-UPF.

In this embodiment of this disclosure, the A-SMF may determine the address information of the first terminal based on the topology information of the 5G VN group.

When an I-UPF exists in the 5G VN, the A-SMF may determine, based on the topology information of the 5G VN group, address information of each terminal served by the I-UPF.

S405: The A-SMF sends a session context response message to the I-SMF, so that the I-SMF receives the session context response message sent by the A-SMF.

The session context response message is used to reply to a context of the first PDU session. In addition, the session context response message includes the route configuration information.

S406: The I-SMF selects a first I-UPF.

It may be understood that, when the first I-UPF is an existing I-UPF in the 5G VN, because the route configuration information includes the configuration information of each I-UPF, the I-SMF may learn of the configuration information of the first I-UPF. In other words, the I-SMF may learn of address information of a third terminal and downlink tunnel information of an access network device accessed by the third terminal.

S407: The I-SMF generates a plurality of routing rules.

The plurality of routing rules includes one or more first routing rules, one second routing rule, and one third routing rule. It may be understood that one first routing rule corresponds to one second terminal.

When the first I-UPF further serves the third terminal, to support the first I-UPF in implementing a local handover function, the plurality of routing rules may further include one or more fifth routing rules. It may be understood that one fifth routing rule corresponds to one third terminal.

It may be understood that, for related descriptions of the first routing rule, refer to the descriptions in the technical solution shown in FIG. 7. For related descriptions of the second routing rule, refer to the descriptions in the technical solution shown in FIG. 8. For related descriptions of the third routing rule, refer to the descriptions in the technical solution shown in FIG. 9. For related descriptions of the fifth routing rule, refer to the descriptions in the technical solution shown in FIG. 15. Details are not described herein again in this embodiment of this disclosure.

S408: The I-SMF sends an N4 session establishment request message to the first I-UPF, so that the first I-UPF receives the N4 session establishment request message.

The N4 session establishment request message is used to establish an N4 session context. The N4 session establishment request message includes the plurality of routing rules.

Optionally, that the N4 session establishment request message includes the plurality of routing rules may be further implemented as follows. The N4 session establishment request message includes a plurality of N4 rules, and the N4 rules include a routing rule.

It should be noted that the N4 rule may further include a QER and a URR in addition to the routing rule.

S409: The first I-UPF installs the plurality of routing rules based on the N4 session establishment request message.

S410: The first I-UPF sends an N4 session establishment response message to the I-SMF, so that the I-SMF receives the N4 session establishment response message sent by the first I-UPF.

The N4 session establishment response message is used to respond to the N4 session context establishment request message.

In a possible design, if the downlink tunnel information of the A-UPF is allocated by the first I-UPF, the N4 session establishment response message includes downlink tunnel information corresponding to each A-UPF that serves the 5G VN group.

Optionally, the A-UPFs that serve the 5G VN group may correspond to same downlink tunnel information. In this case, the N4 session establishment response message includes one piece of downlink tunnel information. It may be understood that the downlink tunnel information is applicable to each A-UPF in the 5G VN.

Optionally, the A-UPFs that serve the 5G VN group may correspond to different downlink tunnel information. In this case, the N4 session establishment response message includes M pieces of downlink tunnel information. It may be understood that the M pieces of downlink tunnel information are in a one-to-one correspondence with M A-UPFs. A value of M is equal to a quantity of A-UPFs that serve the 5G VN group, and M is an integer greater than 1.

In another possible design, if the downlink tunnel information is allocated by the I-SMF, the N4 session establishment response message does not include downlink tunnel information of an A-UPF.

S411: The I-SMF sends a PDU session context update request message to the A-SMF, so that the A-SMF receives the PDU session context update request message sent by the I-SMF.

The PDU session context update request message is used to update the context of the PDU session of the first terminal.

In this embodiment of this disclosure, the PDU session context update request message includes downlink tunnel information corresponding to each A-UPF that serves the 5G VN group.

Optionally, the A-UPFs that serve the 5G VN group may correspond to same downlink tunnel information. In this case, the PDU session context update request message includes one piece of downlink tunnel information.

Optionally, the A-UPFs that serve the 5G VN group may correspond to different downlink tunnel information. In this case, the PDU session context update request message includes M pieces of downlink tunnel information.

It may be understood that the I-SMF may allocate the downlink tunnel information of the A-UPF. Alternatively, when the first I-UPF allocates the downlink tunnel information of the A-UPF, the I-SMF may determine the downlink tunnel information from the N4 session establishment response message sent by the first I-UPF.

S412: The A-SMF configures a routing rule of each A-UPF in the 5G VN.

In a possible implementation, for each A-UPF, the A-SMF generates a fourth routing rule corresponding to the A-UPF, and then the A-SMF sends the fourth routing rule corresponding to the A-UPF to the A-UPF, so that the A-UPF installs the fourth routing rule.

It should be noted that, for a specific implementation of step S412, refer to the descriptions of the technical solution shown in FIG. 10. Details are not described herein again.

Optionally, after the A-SMF configures the routing rule of each A-UPF in the 5G VN, the A-SMF sends a PDU session context update response message to the I-SMF, so that the I-SMF receives the PDU session context update response message sent by the A-SMF. The PDU session context update response message is used to respond to the PDU session context update request message.

According to the technical solution shown in FIG. 16, after the first terminal moves out of the service scope of the A-SMF, the I-SMF configures a routing rule on the first I-UPF, so that the first I-UPF can normally forward a packet that is sent by the first terminal to another terminal in the 5G VN group. In addition, the A-SMF configures a routing rule on each A-UPF, so that the A-UPF can normally forward a packet that is sent by another terminal in the 5G VN group to the first terminal. In this way, a transmission tunnel is established between the first I-UPF and each A-UPF, so that the 5G VN is implemented based on the system architecture 2.

Scenario 2: Before the first terminal moves, the first terminal is located in a service scope of an I-SMF, the I-SMF serves the first terminal, and an I-UPF selected by the I-SMF serves the terminal. After the first terminal moves, the first terminal moves out of the service scope of the I-SMF that serves the first terminal.

It may be understood that a service scope of an SMF is usually greater than or equal to a service scope of a UPF managed by the SMF. Therefore, after the first terminal moves out of the service scope of the I-SMF, it may be assumed that the first terminal moves out of a service scope of an I-UPF that currently serves the first terminal.

Figure 17A:
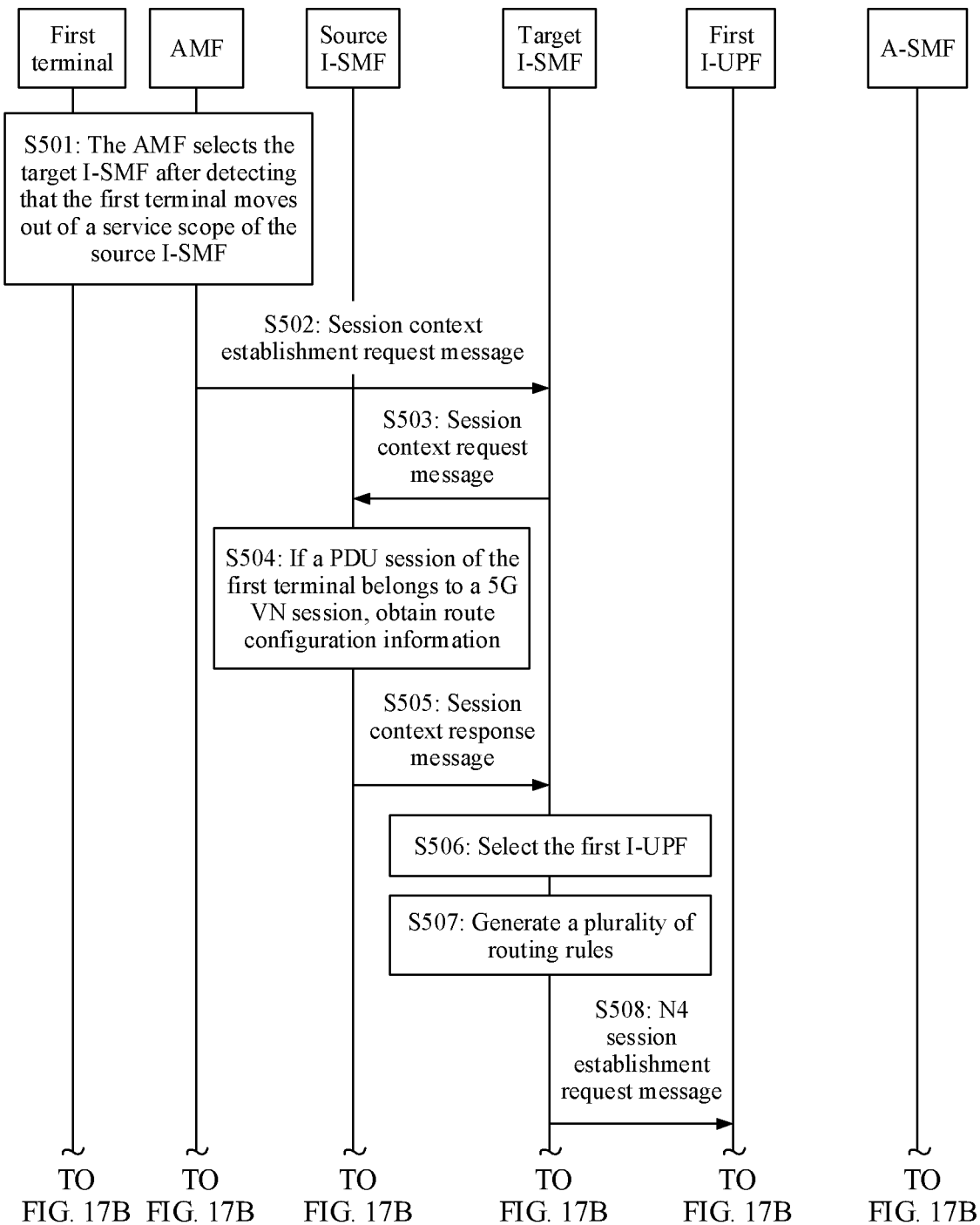
FIG. 17A and FIG. 17B are a flowchart of another route configuration method according to an embodiment of this disclosure.
Figure 17B:
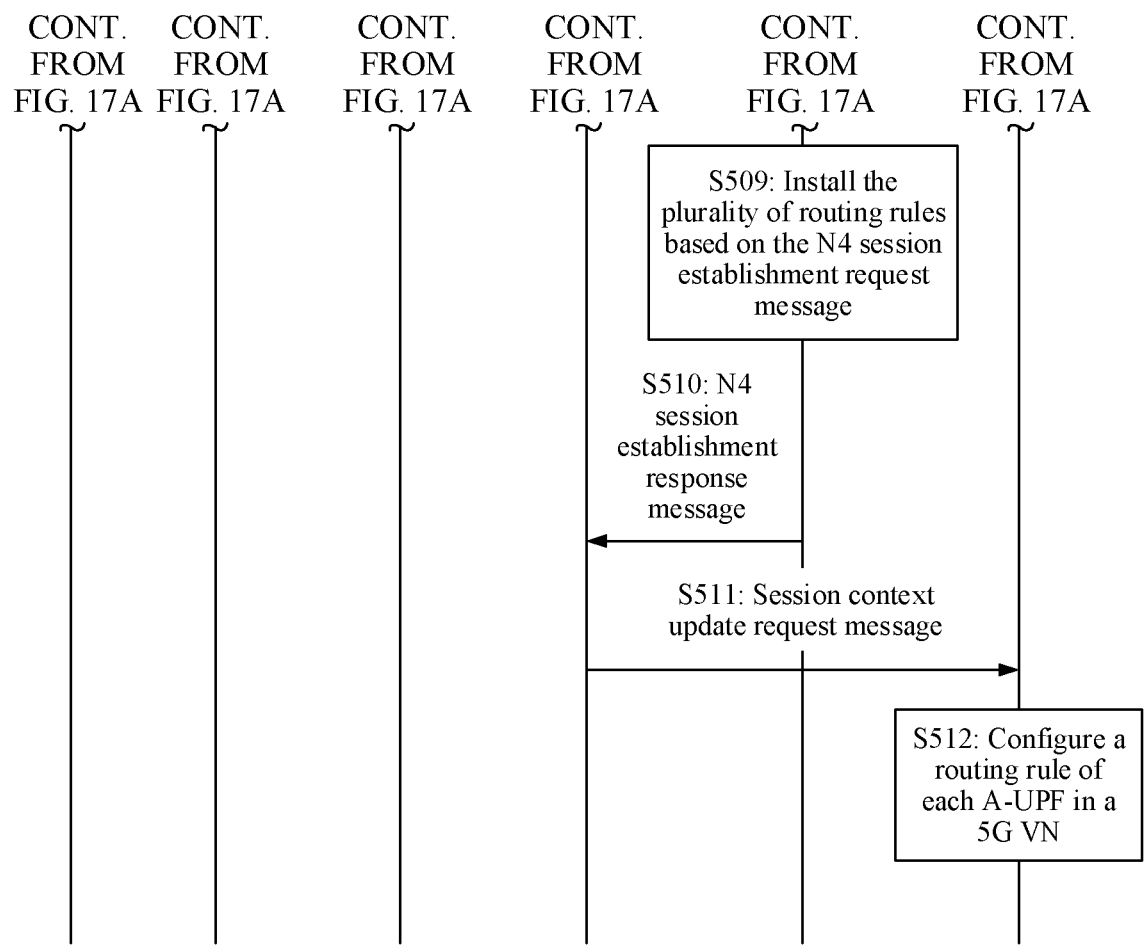

Based on the scenario 2, FIG. 17A and FIG. 17B show a route configuration method according to an embodiment of this disclosure. It should be noted that, in the technical solution shown in FIG. 17A and FIG. 17B, a target I-SMF is configured to implement a function of the foregoing first SMF, and a source I-SMF is configured to implement a function of the foregoing second SMF. The route configuration method includes the following steps.

S501: An AMF selects the target I-SMF after detecting that the first terminal moves out of a service scope of the source I-SMF.

The source I-SMF may be an I-SMF that serves the first terminal before the first terminal moves. The target I-SMF is an I-SMF that serves the first terminal after the first terminal moves.

In a possible implementation, the AMF monitors a location of the first terminal. When the location of the first terminal is outside the service scope of the source I-SMF, the AMF selects, based on the location of the first terminal and a service scope of each SMF, the target I-SMF that serves the first terminal.

S502: The AMF sends a session context establishment request message to the target I-SMF, so that the target I-SMF receives the session context establishment request message sent by the AMF.

S503: The target I-SMF sends a session context request message to the source I-SMF, so that the source I-SMF receives the session context request message sent by the target I-SMF.

S504: If a first PDU session belongs to a 5G VN session, the source I-SMF obtains route configuration information.

S505: The source I-SMF sends a session context response message to the target I-SMF, so that the target I-SMF receives the session context response message sent by the source I-SMF. S506: The target I-SMF selects a first I-UPF.

S507: The target I-SMF generates a plurality of routing rules.

S508: The target I-SMF sends an N4 session establishment request message to the first I-UPF, so that the first I-UPF receives the N4 session establishment request message sent by the target I-SMF.

S509: The first I-UPF installs the plurality of routing rules based on the N4 session establishment request message.

S510: The first I-UPF sends an N4 session establishment response message to the target I-SMF, so that the target I-SMF receives the N4 session establishment response message sent by the first I-UPF.

S511: The target I-SMF sends a PDU session context update request message to the A-SMF, so that the A-SMF receives the PDU session context update request message sent by the target I-SMF.

S512: The A-SMF configures a routing rule of each A-UPF in the 5G VN.

Steps S502 to S512 are similar to steps S402 to S412. For specific implementation of steps S502 to S512, refer to the descriptions of steps S402 to S412 in the foregoing embodiment. Details are not described herein again.

According to the technical solution shown in FIG. 17A and FIG. 17B, after the first terminal moves out of the service scope of the source I-SMF, the target I-SMF configures a routing rule on the first I-UPF, so that the first I-UPF can normally forward a packet that is sent by the first terminal to another terminal in the 5G VN group. In addition, the A-SMF configures a routing rule on each A-UPF, so that the A-UPF can normally forward a packet that is sent by another terminal in the 5G VN group to the first terminal. In this way, a transmission tunnel is established between the first I-UPF and each A-UPF, so that the 5G VN is implemented based on the system architecture 2.

Scenario 3: Before the first terminal moves, the first terminal is located in a service scope of an A-SMF, and the A-SMF serves the first terminal. After the first terminal moves, the first terminal does not move out of the service scope of the A-SMF, but the first terminal moves out of a service scope of a UPF that currently serves the first terminal.

Figure 18:
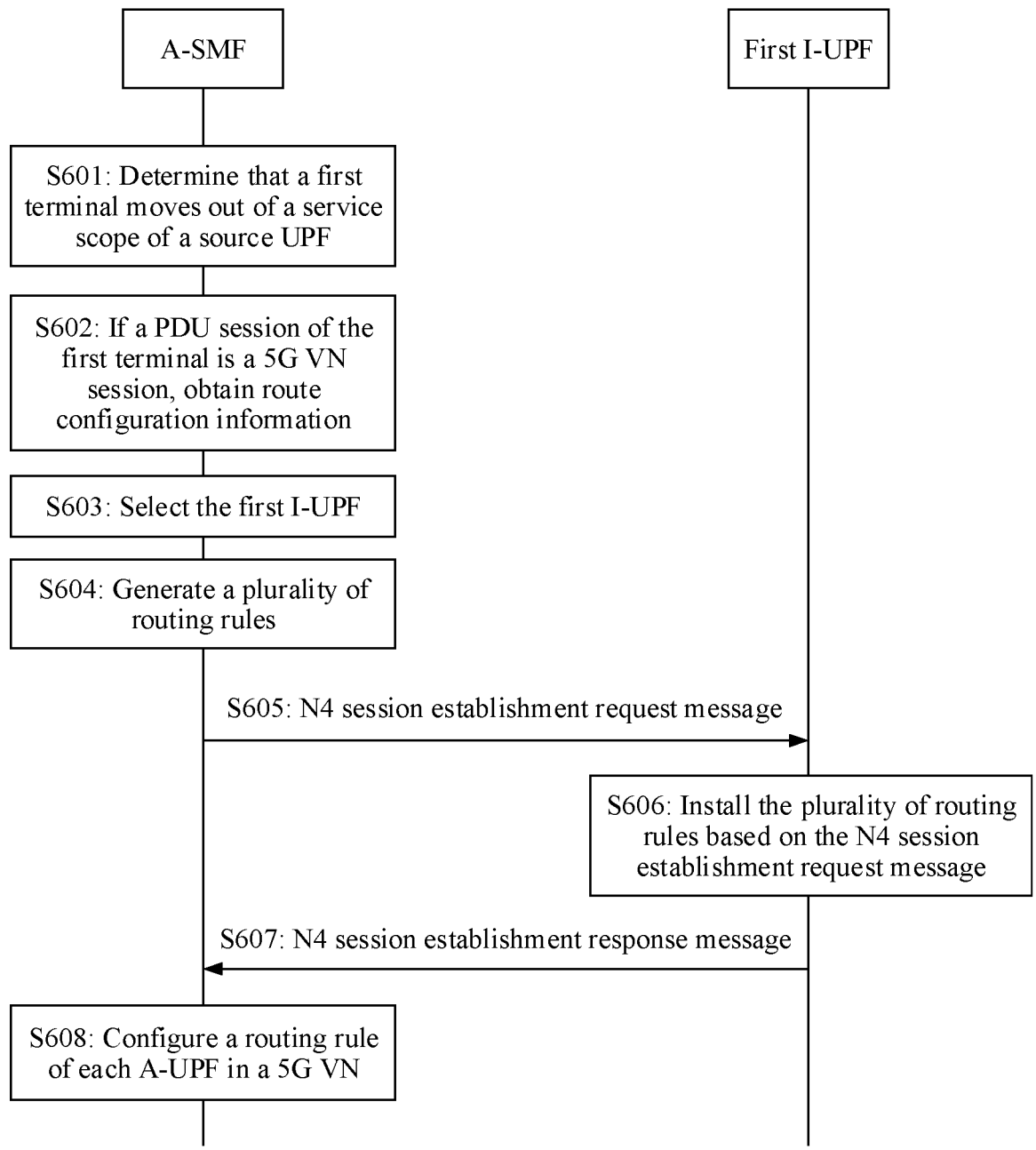
FIG. 18 is a flowchart of another route configuration method according to an embodiment of this disclosure.

Based on the scenario 3, FIG. 18 shows a route configuration method according to an embodiment of this disclosure. It should be noted that, in the technical solution shown in FIG. 18, an A-SMF is configured to implement a function of the foregoing first SMF. The route configuration method includes the following steps.

S601: The A-SMF determines that the first terminal moves out of a service scope of a source UPF.

In a possible implementation, the A-SMF receives a first notification message sent by an AMF. The first notification message includes location information of the first terminal. The A-SMF may monitor, based on the location information of the first terminal and the service scope of the source UPF, whether the first terminal moves out of the service scope of the source UPF. Therefore, when the location of the first terminal is outside the service scope of the source UPF, the A-SMF may determine that the first terminal moves out of the service scope of the source UPF.

In another possible implementation, when the A-SMF receives a second notification message sent by the AMF, the A-SMF determines that the first terminal moves out of the service scope of the source UPF. The second notification message is used to indicate that the first terminal moves out of the service scope of the source UPF.

It may be understood that the AMF may obtain the service scope of the source UPF from the A-SMF, and monitor whether the first terminal moves out of the service scope of the source UPF. After the first terminal moves out of the service scope of the source UPF, the AMF sends the second notification message to the A-SMF.

S602: If a first PDU session is a 5G VN session, the A-SMF obtains route configuration information.

S603: The A-SMF selects a first I-UPF.

S604: The A-SMF generates a plurality of routing rules.

S605: The A-SMF sends an N4 session establishment request message to the first I-UPF, so that the first I-UPF receives the N4 session establishment request message sent by the A-SMF.

S606: The first I-UPF installs the plurality of routing rules based on the N4 session establishment request message.

S607: The first I-UPF sends an N4 session establishment response message to the A-SMF, so that the A-SMF receives the N4 session establishment response message sent by the first I-UPF.

S608: The A-SMF configures a routing rule of each A-UPF in the 5G VN.

Step S602 is similar to step S404. For specific implementation of step S602, refer to the descriptions of step S404. Details are not described herein again. Steps S603 to S607 are similar to steps S406 to S410. For specific implementation of steps S603 to S607, refer to the descriptions of steps S406 to S410. Details are not described herein again. Step S608 is similar to step S412. For specific implementation of step S608, refer to the descriptions of step S412. Details are not described herein again.

According to the technical solution shown in FIG. 18, when the first terminal is located in a service area of the A-SMF, after the first terminal moves out of a service scope of a UPF that serves the first terminal, the A-SMF configures a routing rule on the first I-UPF, so that the first I-UPF can normally forward a packet that is sent by the first terminal to another terminal in the 5G VN group. In addition, the A-SMF configures a routing rule on each A-UPF, so that the A-UPF can normally forward a packet that is sent by another terminal in the 5G VN group to the first terminal. In this way, a transmission tunnel is established between the first I-UPF and each A-UPF, so that the 5G VN is implemented based on the system architecture 2.

Scenario 4: Before the first terminal moves, the first terminal is located in a service scope of an I-SMF, and the I-SMF serves the first terminal. After the first terminal moves, the first terminal does not move out of the service scope of the I-SMF, but the first terminal moves out of a service scope of a UPF that currently serves the first terminal.

Figure 19:
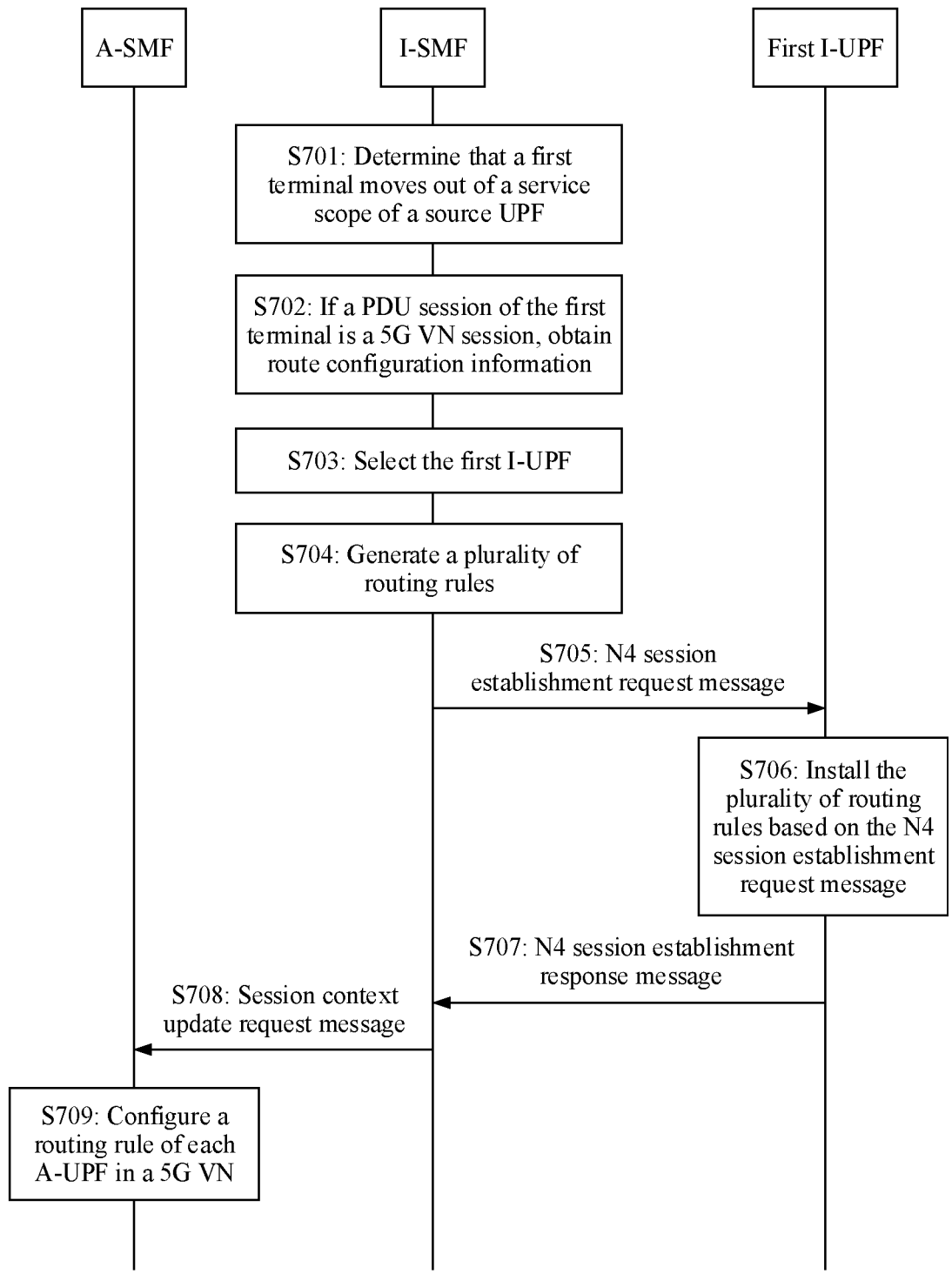
FIG. 19 is a flowchart of another route configuration method according to an embodiment of this disclosure.

Based on the scenario 4, FIG. 19 shows a route configuration method according to an embodiment of this disclosure. It should be noted that, in the technical solution shown in FIG. 19, an I-SMF is configured to implement a function of the foregoing first SMF. The route configuration method includes the following steps.

S701: The I-SMF determines that the first terminal moves out of a service scope of a source UPF.

S702: If a first PDU session is a 5G VN session, the I-SMF obtains route configuration information.

In a possible implementation, the I-SMF obtains the route configuration information from a context stored by the I-SMF.

S703: The I-SMF selects a first I-UPF.

S704: The I-SMF generates a plurality of routing rules.

S705: The I-SMF sends an N4 session establishment request message to the first I-UPF, so that the first I-UPF receives the N4 session establishment request message sent by the I-SMF.

S706: The first I-UPF installs the plurality of routing rules based on the N4 session establishment request message.

S707: The first I-UPF sends an N4 session establishment response message to the I-SMF, so that the I-SMF receives the N4 session establishment response message sent by the first I-UPF.

S708: The I-SMF sends a PDU session context update request message to the A-SMF, so that the A-SMF receives the PDU session context update request message sent by the I-SMF. S709: The A-SMF configures a routing rule of each A-UPF in the 5G VN.

Steps S701 to S707 are similar to step S601 to S607. For specific implementation of steps S701 to S707, refer to the descriptions of steps S601 to S607. Details are not described herein again. Steps S708 and S709 are similar to steps S411 and S412. For specific implementation of steps S708 and S709, refer to the descriptions of steps S411 and S412. Details are not described herein again.

According to the technical solution shown in FIG. 19, when the first terminal is located in a service area of the I-SMF, after the first terminal moves out of a service scope of a UPF that serves the first terminal, the I-SMF configures a routing rule on the first I-UPF, so that the first I-UPF can normally forward a packet that is sent by the first terminal to another terminal in the 5G VN group. In addition, the A-SMF configures a routing rule on each A-UPF, so that the A-UPF can normally forward a packet that is sent by another terminal in the 5G VN group to the first terminal. In this way, a transmission tunnel is established between the first I-UPF and each A-UPF, so that the 5G VN is implemented based on the system architecture 2.

It should be noted that a RAN node between a UPF and UE is not drawn in FIG. 4, FIG. 6, and FIG. 11 to FIG. 14.

In embodiments, the SMF may also be referred to as a session management network element, the UPF may be referred to as a user plane network element, the AMF may be referred to as a mobility management network element, and the 5G VN may also be referred to as a virtual network.

In embodiments, for ease of description, embodiments of this disclosure are described by using an example in which a provided method is applied to a 5G system. During actual implementation, the foregoing route configuration methods may be further applied to an Evolved Packet System (EPS). In this case, the foregoing network element only needs to be replaced with a network element that has a corresponding function in the EPS. In this case, the session may be a public data network (PDN) connection in the EPS. The PDN connection is an IP connection that is between a terminal and an PDN of a PLMN and that is provided by an EPS network.

It should be noted that the steps performed by the SMF in the methods provided in embodiments of this disclosure may also be performed by a chip applied to the SMF, the steps performed by the transit device may also be performed by a chip applied to the transit device, and the steps performed by the UPF may also be performed by a chip applied to the UPF.

It should be noted that names of messages between network elements, names of parameters in the messages, or the like in embodiments of this disclosure are merely examples, and there may be other names during specific implementation. This is not limited in embodiments of this disclosure.

It should be noted that mutual reference may be made between embodiments of this disclosure. For example, for same or similar steps, mutual reference may be made between a method embodiment, a communications system embodiment, and an apparatus embodiment. This is not limited.

The foregoing mainly describes the solutions in embodiments of this disclosure from the perspective of interaction between network elements. It may be understood that, to implement the foregoing functions, network elements such as the SMF and the UPF include corresponding hardware structures and/or software modules for performing the foregoing functions. A person skilled in the art should be easily aware that, in combination with examples of units and algorithm steps described in embodiments disclosed in this specification, this disclosure can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, the SMF and the UPF may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in embodiments of this disclosure, division into units is an example, and is merely logical function division. During actual implementation, another division manner may be used.

Figure 20:
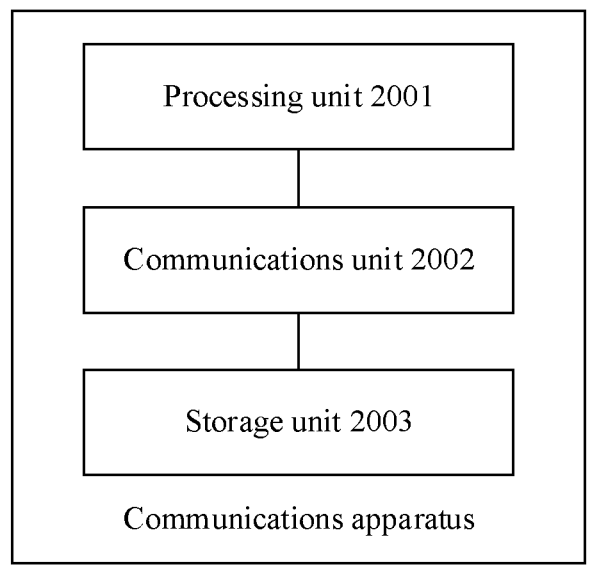
FIG. 20 is a schematic diagram of a structure of a communications apparatus according to an embodiment of this disclosure.

When an integrated unit is used, FIG. 20 shows a communications apparatus in embodiments. The communications apparatus may include a processing unit 2001 and a communications unit 2002. Optionally, the communications apparatus further includes a storage unit 2003.

In an example, the communications apparatus may be the first SMF mentioned above, or a chip applied to the first SMF. In this case, the processing unit 2001 is configured to support the first SMF in performing steps S101 to S103 in FIG. 7, steps S106 and S107 in FIG. 8, steps S110 and S111 in FIG. 9, steps S301 and S302 in FIG. 15, and/or another processing operation that needs to be performed by the first SMF in this embodiment of this disclosure, and the communications unit 2002 is configured to support the first SMF in performing step S104 in FIG. 7, step S108 in FIG. 8, step S112 in FIG. 9, step S303 in FIG. 15, and/or another communication operation that needs to be performed by the first SMF in this embodiment of this disclosure.

In another example, the communications apparatus may be the first I-UPF mentioned above, or a chip applied to the first I-UPF. In this case, the processing unit 2001 is configured to support the first I-UPF in performing step S105 in FIG. 7, step S109 in FIG. 8, step S113 in FIG. 9, step S304 in FIG. 15, and/or another processing operation that needs to be performed by the first I-UPF in this embodiment of this disclosure, and the communications unit 2002 is configured to support the first I-UPF in performing step S104 in FIG. 7, step S108 in FIG. 8, step S112 in FIG. 9, step S303 in FIG. 15, and/or another communication operation that needs to be performed by the first I-UPF in this embodiment of this disclosure.

In another example, the communications apparatus may be the A-SMF mentioned above, or a chip applied to the A-SMF. In this case, the processing unit 2001 is configured to support the A-SMF in performing steps S201 to S203 in FIG. 10 and/or another processing operation that needs to be performed by the A-SMF in this embodiment of this disclosure, and the communications unit 2002 is configured to support the A-SMF in performing step S204 in FIG. 10 and/or another communication operation that needs to be performed by the A-SMF in this embodiment of this disclosure.

In another example, the communications apparatus may be the second A-UPF mentioned above, or a chip applied to the second A-UPF. In this case, the processing unit 2001 is configured to support the second A-UPF in performing step S205 in FIG. 10 and/or another processing operation that needs to be performed by the second A-UPF in this embodiment of this disclosure, and the communications unit 2002 is configured to support the second A-UPF in performing step S204 in FIG. 10 and/or another communication operation that needs to be performed by the second A-UPF in this embodiment of this disclosure.

When an integrated unit in FIG. 20 is implemented in a form of a software function module and sold or used as an independent product, the integrated unit may be stored in a computer-readable storage medium. Based on such an understanding, the technical solutions of embodiments of this disclosure essentially, or the part contributing to the conventional technology, or all or a part of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this disclosure. The storage medium that stores the computer software product includes any medium that can store program code, such as a Universal Serial Bus (USB) flash drive, a removable hard disk, a read-only memory (ROM), a random-access memory (RAM), a magnetic disk, or an optical disc.

The units in FIG. 20 may also be referred to as modules. For example, the processing unit may be referred to as a processing module.

Figure 21:
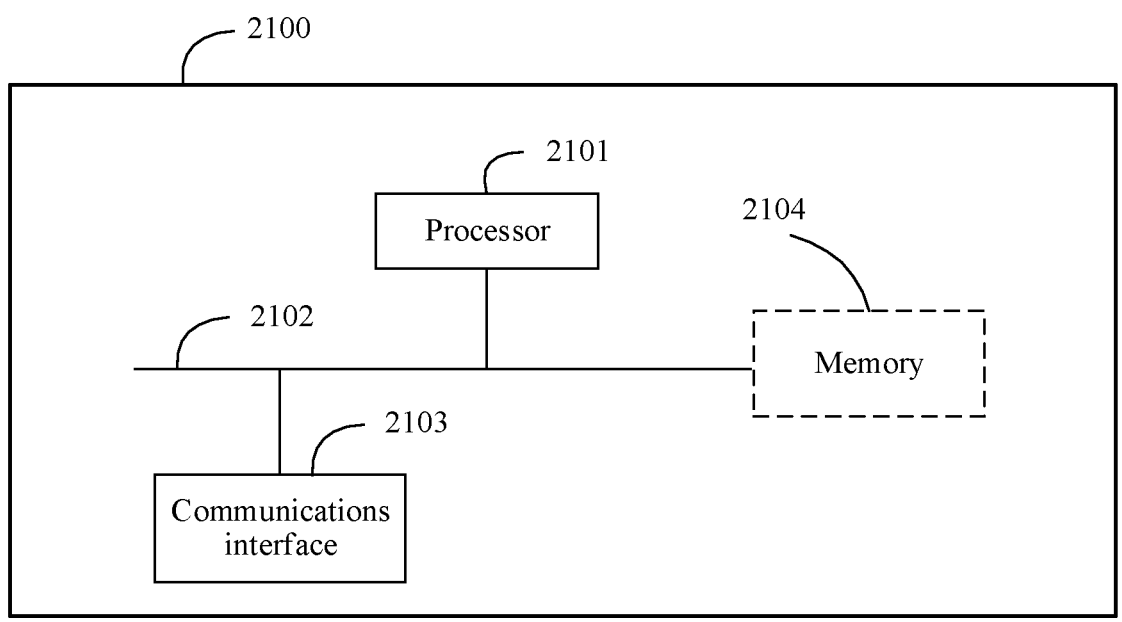
FIG. 21 is a schematic diagram of a structure of a communications apparatus according to an embodiment of this disclosure.

FIG. 21 is a schematic diagram of a hardware structure of a communications apparatus 2100 according to an embodiment of this disclosure. The communications apparatus 2100 includes one or more processors 2101 and a communications interface 2103.

Optionally, the communications apparatus 2100 further includes a memory 2104. The memory 2104 may include a ROM and a RAM, and provide operation instructions and data for the processor 2101. A part of the memory 2104 may further include a nonvolatile RAM (NVRAM).

In this embodiment of this disclosure, the communications apparatus 2100 invokes the operation instructions stored in the memory 2104 (the operation instructions may be stored in an operating system), to perform corresponding operations.

The processor 2101 may also be referred to as a central processing unit (CPU).

The processor 2101, the communications interface 2103, and the memory 2104 are coupled together by using a bus system 2102. The bus system 2102 may further include a power bus, a control bus, a status signal bus, and the like in addition to a data bus. However, for clarity of description, various buses are marked as the bus system 2102 in FIG. 21.

The methods disclosed in embodiments of this disclosure may be applied to the processor 2101, or may be implemented by the processor 2101. The processor 2101 may be an integrated circuit chip and has a signal processing capability. In an implementation process, the steps of the foregoing methods may be completed by using an integrated logic circuit of hardware in the processor 2101 or instructions in a form of software. The processor 2101 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in embodiments of this disclosure. The general-purpose processor may be a microprocessor, or the processor may be any conventional processor or the like. The steps of the methods disclosed with reference to embodiments of this disclosure may be directly performed and completed by a hardware decoding processor, or may be performed and completed by using a combination of hardware and software modules in the decoding processor. The software module may be located in a mature storage medium in the art, for example, a RAM, a flash memory, a ROM, a programmable ROM (PROM), an electrically erasable PROM (EEPROM), or a register. The storage medium is located in the memory 2104, and the processor 2101 reads information in the memory 2104 and completes the steps of the foregoing methods in combination with hardware of the processor.

In a possible implementation, the processor 2101 controls the communications interface 2103 to perform receiving and sending steps of the first SMF, the first I-UPF, the A-SMF, or the second A-UPF in embodiments of this disclosure. The processor 2101 is configured to perform processing steps of the first SMF, the first I-UPF, the A-SMF, or the second A-UPF in embodiments of this disclosure.

The foregoing communications unit or communications interface may be an interface circuit or a communications interface in the apparatus for receiving a signal from another apparatus. For example, when the apparatus is implemented as a chip, the communications unit or communications interface is an interface circuit or a communications interface in the chip for receiving a signal from or sending a signal to another chip or apparatus.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or some of the procedures or the functions according to embodiments of this disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

Optionally, an embodiment of this disclosure further provides a computer-readable storage medium. The computer-readable storage medium stores computer instructions. When the computer-readable storage medium is run on a computer, the computer is enabled to perform the route configuration methods provided in embodiments of this disclosure.

An embodiment of this disclosure further provides a computer program product that includes computer instructions. When the computer program product runs on a computer, the computer is enabled to perform the route configuration methods provided in embodiments of this disclosure.

An embodiment of this disclosure provides a chip. The chip includes a processor. When the processor executes instructions, the chip is enabled to perform the route configuration methods provided in embodiments of this disclosure.

All or some of embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, all or some of the procedures or the functions according to embodiments of this disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although this disclosure is described with reference to embodiments, in a process of implementing this disclosure that claims protection, a person skilled in the art may understand and implement another variation of disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that the measures cannot be combined to produce a good effect.

Although this disclosure is described with reference to specific features and embodiments thereof, it is clear that various modifications and combinations may be made without departing from the scope of this disclosure. Correspondingly, this specification and the accompanying drawings are merely example descriptions of this disclosure defined by the appended claims, and are considered as any of or all modifications, variations, combinations, or equivalents that cover the scope of this disclosure. It is clear that a person skilled in the art can make various modifications and variations to this disclosure without departing from the spirit and scope of this disclosure. This disclosure is intended to cover these modifications and variations of this disclosure provided that they fall within the scope of the claims of this disclosure and their equivalent technologies.

The invention claimed is:

1. A route configuration method implemented by a session management network element, wherein the route configuration method comprises:
   determining a first intermediate user plane network element that serves a first terminal in a virtual network group and maintains communication between a first anchor user plane network element and a first access network device accessed by the first terminal;
   obtaining first address information of a second terminal;
   obtaining first uplink tunnel information of a second anchor user plane network element, wherein the second anchor user plane network element meets a first condition and a second condition,
      wherein the first condition is that the second anchor user plane network element provides an anchor service for the second terminal in the virtual network group and the second terminal is located in a service area of the second anchor user plane network element; and
      wherein the second condition is that the second anchor user plane network element is different from the first anchor user plane network element;
   generating, based on the first address information and the first uplink tunnel information, a first routing rule corresponding to the second terminal, wherein the first routing rule is for sending, to the second anchor user plane network element, a first packet comprising the first address information as a first destination address; and
   sending, to the first intermediate user plane network element, the first routing rule.

2. The route configuration method of claim 1, further comprising:
   obtaining second uplink tunnel information of the first anchor user plane network element;
   generating, based on the second uplink tunnel information, a second routing rule, wherein the second routing rule is for sending, to the first anchor user plane network element, a second packet that does not match another routing rule; and
   sending, to the first intermediate user plane network element, the second routing rule.

3. The route configuration method of claim 1, further comprising:
   obtaining, second address information of the first terminal and downlink tunnel information of the first access network device;
   generating, based on the second address information and the downlink tunnel information, a second routing rule corresponding to the first terminal, wherein the second routing rule is for sending, to the first access network device, a second packet comprising the second address information as a second destination address; and
   sending, to the first intermediate user plane network element, the second routing rule.

4. The route configuration method of claim 1, further comprising:
   obtaining second address information of a third terminal, other than the first terminal, and downlink tunnel information of a second access network device accessed by the third terminal;
   generating, based on the second address information and the downlink tunnel information, a second routing rule corresponding to the third terminal, wherein the second routing rule is for sending, to the second access network device, a second packet comprising the second address information as a second destination address; and sending to the first intermediate user plane network element, the second routing rule.

5. The route configuration method of claim 1, further comprising:
identifying that the session management network element is an anchor session management network element configured to manage anchor user plane network elements that serve the virtual network group;
obtaining, in response to the identifying, second address information of the first terminal and downlink tunnel information of the second anchor user plane network element;
generating, based on the second address information and the downlink tunnel information, a second routing rule corresponding to the second anchor user plane network element, wherein the second routing rule is for sending, to the first intermediate user plane network element, a second packet comprising the second address information as a second destination address; and
sending, to the second anchor user plane network element, the second routing rule.

6. The route configuration method of claim 1, further comprising:
identifying that the session management network element is not an anchor session management network element configured to manage anchor user plane network elements that serve the virtual network group;
obtaining, in response to the identifying, downlink tunnel information of the second anchor user plane network element; wherein the downlink tunnel information enables the anchor session management network element to generate a second routing rule corresponding to the second anchor user plane network element, and wherein the second routing rule is for sending, to the first intermediate user plane network element, a second packet comprising second address information of the first terminal as a second destination address; and
sending, to the anchor session management network element, the downlink tunnel information.

7. A route configuration method implemented by an intermediate user plane network element, wherein the route configuration method comprises:
maintaining communication between a first anchor user plane network element and a first access network device accessed by a first terminal of a virtual network group;
receiving, from a session management network element, a first routing rule corresponding to a second terminal of the virtual network group wherein the first routing rule is for sending a first packet comprising first address information of the second terminal as a first destination address to a second anchor user plane network element, and wherein the second anchor user plane network element meets a first condition and a second condition,
wherein the first condition is that the second anchor user plane network element provides an anchor service for the second terminal in the virtual network group, and the second terminal is located in a service area of the second anchor user plane network element; and
wherein the second condition is that the second anchor user plane network element is different from the first anchor user plane network element; and installing the first routing rule.

8. The route configuration method of claim 7, further comprising:
receiving, from the session management network element, a second routing rule, wherein the second routing rule is for sending, to the first anchor user plane network element, a second packet that does not match another routing rule; and
installing the second routing rule.

9. The route configuration method of claim 7, further comprising:
receiving, from the session management network element, a second routing rule, wherein the second routing rule is for sending, to the first access network device, a second packet comprising second address information of the first terminal as a second destination address; and
installing the second routing rule.

10. The route configuration method of claim 7, further comprising:
receiving a second routing rule corresponding to a third terminal other than the first terminal, wherein the second routing rule is for sending, to a second access network device accessed by the third terminal, a second packet comprising second address information of the third terminal as a second destination address; and
installing the second routing rule.

11. A communications apparatus, comprising:
a processor; and
a memory coupled to the processor and configured to store instructions, wherein when executed by the processor, the instructions cause the communications apparatus to:
determine a first intermediate user plane network element that serves a first terminal in a virtual network group and maintains communication between a first anchor user plane network element and a first access network device accessed by the first terminal;
obtain first address information of a second terminal;
obtain first uplink tunnel information of a second anchor user plane network element, wherein the second anchor user plane network element meets a first condition and a second condition,
wherein the first condition is that the second anchor user plane network element provides an anchor service for the second terminal in the virtual network group and the second terminal is located in a service area of the second anchor user plane network element; and
wherein the second condition is that the second anchor user plane network element is different from the first anchor user plane network element;
generate, based on the first address information and the first uplink tunnel information, a first routing rule corresponding to the second terminal, wherein the first routing rule is for sending, to the second anchor user plane network element, a first packet comprising the first address information as first destination address; and
send, to the first intermediate user plane network element, the first routing rule.

12. The communications apparatus of claim 11, wherein when executed by the processor, the instructions further cause the communications apparatus to:
obtain second uplink tunnel information of the first anchor user plane network element;
generate, based on the second uplink tunnel information, a second routing rule, wherein the second routing rule is for sending, to the first anchor user plane network element, a second packet that does not match another routing rule; and
send, to the first intermediate user plane network element, the second routing rule.

13. The communications apparatus of claim 11, wherein when executed by the processor, the instructions further cause the communications apparatus to:
obtain second address information of the first terminal and downlink tunnel information of the first access network device;
generate, based on the second address information and the downlink tunnel information, a second routing rule corresponding to the first terminal, wherein the second routing rule is for sending, to the first access network device, a second packet comprising the second address information as second destination address; and
send, to the first intermediate user plane network element, the second routing rule.

14. The communications apparatus of claim 11, wherein when executed by the processor, the instructions further cause the communications apparatus to:
obtain second address information of a third terminal, other than the first terminal, and downlink tunnel information of a second access network device accessed by the third terminal;
generate, based on the second address information and the downlink tunnel information, a second routing rule corresponding to the third terminal wherein the second routing rule is for sending, to the second access network device, a second packet comprising the second address information as second destination address; and
send, to the first intermediate user plane network element, the second routing rule.

15. The communications apparatus of claim 11, wherein when executed by the processor, the instructions further cause the communications apparatus to:
identify that the communications apparatus is an anchor session management network element configured to manage anchor user plane network elements that serve the virtual network group;
obtain, in response to the identifying, second address information of the first terminal and downlink tunnel information of the second anchor user plane network element;
generate, based on the second address information and the downlink tunnel information, a second routing rule corresponding to the second anchor user plane network element, wherein the second routing rule is for sending, to the first intermediate user plane network element, a second packet comprising the second address information as second destination address; and
send, to the second anchor user plane network element, the second routing rule.

16. The communications apparatus of claim 11, wherein when executed by the processor, the instructions further cause the communications apparatus to:
identify that the communications apparatus is not an anchor session management network element configured to manage anchor user plane network elements that serve the virtual network group;
obtain, in response to the identifying, second address information of the first terminal and downlink tunnel information of the second anchor user plane network element, wherein the downlink tunnel information of enables the anchor session management network element to generate a second routing rule corresponding to the second anchor user plane network element, and wherein the second routing rule is for sending, to the first intermediate user plane network element, a second packet comprising as second address information of the first terminal as second destination address; and
send, to the anchor session management network element, the downlink tunnel information.

17. A communications apparatus, comprising:
a processor; and
a memory coupled to the processor and configured to store instructions, wherein when executed by the processor, the instructions cause the communications apparatus to:
maintain communication between a first anchor user plane network element and a first access network device accessed by a first terminal of a virtual network group;
receive, from a first session management network element and after being inserted into a user plane path of a first terminal, a first routing rule corresponding to a second terminal of the virtual network group, wherein the first routing rule is for sending a first packet comprising first address information of the second terminal as first destination address information to a second anchor user plane network element, and wherein the second anchor user plane network element meets a first condition and a second condition,
wherein the first condition is that the second anchor user plane network element provides an anchor service for the second terminal in the virtual network group, and the second terminal is located in a service area of the second anchor user plane network element; and
wherein the second condition is that the second anchor user plane network element is different from the first anchor user plane network element; and
install the first routing rule.

18. The communications apparatus of claim 17, wherein when executed by the processor, the program instructions further cause the communications apparatus to:
receive, from the session management network element, a second routing rule, wherein the second routing rule is for sending, to the first anchor user plane network element, a second packet that does not match another routing rule; and
install the second routing rule.

19. The communications apparatus of claim 17, wherein when executed by the processor, the instructions further cause the communications apparatus to:
receive, from the session management network element, a second routing rule, wherein the second routing rule is for sending, to the first access network device, a second packet comprising second address information of the first terminal as second destination address; and
install the second routing rule.

20. The communications apparatus of claim 17, wherein when executed by the processor, the instructions further cause the communications apparatus to:
receive a second routing rule corresponding to a third terminal that is other than the first terminal wherein the second routing rule is for sending, to a second access network device accessed by the third terminal, a second packet comprising second address information of the third terminal as second destination address information; and
install the second routing rule.

* * * * *

UNITED STATES PATENT AND TRADEMARK OFFICE
CERTIFICATE OF CORRECTION

| | |
|---|---|
| PATENT NO. | : 12,256,306 B2 |
| APPLICATION NO. | : 17/854402 |
| DATED | : March 18, 2025 |
| INVENTOR(S) | : Qi Yao et al. |

It is certified that error appears in the above-identified patent and that said Letters Patent is hereby corrected as shown below:

In the Claims

Claim 6, Column 43, Line 33: "element; wherein" should read "element, wherein"

Claim 16, Column 45, Lines 65-66: "information of enables the" should read "information enables the"

Claim 17, Column 46, Line 31: "group, and the" should read "group and the"

Signed and Sealed this
Sixth Day of May, 2025

Coke Morgan Stewart
*Acting Director of the United States Patent and Trademark Office*